(12) United States Patent
Vilkamo et al.

(10) Patent No.: US 11,284,211 B2
(45) Date of Patent: *Mar. 22, 2022

(54) DETERMINATION OF TARGETED SPATIAL AUDIO PARAMETERS AND ASSOCIATED SPATIAL AUDIO PLAYBACK

(71) Applicant: Nokia Technologies Oy, Espoo (FI)

(72) Inventors: Juha Vilkamo, Helsinki (FI); Mikko-Ville Laitinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/624,353

(22) PCT Filed: Jun. 13, 2018

(86) PCT No.: PCT/FI2018/050445
§ 371 (c)(1),
(2) Date: Dec. 19, 2019

(87) PCT Pub. No.: WO2018/234625
PCT Pub. Date: Dec. 27, 2018

(65) Prior Publication Data
US 2020/0128349 A1    Apr. 23, 2020

(30) Foreign Application Priority Data

Jun. 23, 2017  (GB) .................................... 1710085

(51) Int. Cl.
*H04R 5/02*    (2006.01)
*H04S 7/00*    (2006.01)
(Continued)

(52) U.S. Cl.
CPC ............... *H04S 7/303* (2013.01); *G06T 7/55* (2017.01); *H04R 1/406* (2013.01); *H04R 3/005* (2013.01);
(Continued)

(58) Field of Classification Search
CPC ........... H04S 7/303; G06T 7/55; H04R 1/406; H04R 3/005
See application file for complete search history.

(56) References Cited

U.S. PATENT DOCUMENTS 8,194,500 B2    6/2012  Wolff et al.
9,313,599 B2    4/2016  Tammi et al. .................. 381/26
(Continued)

FOREIGN PATENT DOCUMENTS

DE    102007032272 B4    7/2014
JP    2009216473 A    9/2009
(Continued)

OTHER PUBLICATIONS

Rummukainen, Olli, et al., "Evaluation of Binaural Reproduction Systems from Behavioral Patterns in six-degrees-of-freedom wayfinding task", May 31, 2017, 2017 Ninth International Conference on Quality of Multimedia Experience, abstract only, 1 pg.
(Continued)

*Primary Examiner* — Simon King
(74) *Attorney, Agent, or Firm* — Harrington & Smith

(57) ABSTRACT

A method for spatial audio signal processing, including determining at least one direction parameter for at least one frequency band based on microphone signals received from a microphone array; processing the determined at least one direction parameter to determine at least one distance parameter for the at least one frequency band; and enabling an output and/or store of the at least one distance parameter, at least one audio signal, and the at least one direction parameter.

21 Claims, 14 Drawing Sheets

(51) Int. Cl.
  *G06T 7/55* (2017.01)
  *H04R 1/40* (2006.01)
  *H04R 3/00* (2006.01)
  *H04R 5/04* (2006.01)
  *H04S 3/00* (2006.01)

(52) U.S. Cl.
  CPC ............ *H04R 5/02* (2013.01); *H04R 5/04* (2013.01); *H04S 3/008* (2013.01); *G06T 2207/10028* (2013.01); *H04S 2400/01* (2013.01); *H04S 2400/15* (2013.01)

(56) References Cited

U.S. PATENT DOCUMENTS

| | | | |
|---|---|---|---|
| 9,456,289 B2 | 9/2016 | Tammi et al. | 381/92 |
| 9,485,574 B2 | 11/2016 | Sun et al. | |
| 10,382,849 B2 | 8/2019 | Laitinen et al. | H04R 1/005 |
| 2009/0207131 A1 | 8/2009 | Togami et al. | |
| 2012/0140947 A1* | 6/2012 | Shin | H04R 3/005 |
| | | | 381/92 |
| 2013/0064375 A1 | 3/2013 | Atkins et al. | 381/17 |
| 2013/0132845 A1* | 5/2013 | Tammi | G01S 3/8006 |
| | | | 715/728 |
| 2013/0259243 A1 | 10/2013 | Herre et al. | |
| 2013/0272097 A1 | 10/2013 | Kim et al. | 367/129 |
| 2015/0016641 A1* | 1/2015 | Ugur | G10L 21/0216 |
| | | | 381/303 |
| 2015/0098571 A1* | 4/2015 | Jarvinen | H04S 7/302 |
| | | | 381/1 |
| 2015/0124980 A1* | 5/2015 | Vilermo | H04R 3/005 |
| | | | 381/58 |
| 2015/0139426 A1* | 5/2015 | Tammi | H04S 7/30 |
| | | | 381/17 |
| 2015/0156578 A1 | 6/2015 | Alexandridis et al. | 1/8 |
| 2015/0186109 A1* | 7/2015 | Jarvinen | G06F 3/167 |
| | | | 715/728 |
| 2015/0208156 A1* | 7/2015 | Virolainen | H04R 3/04 |
| | | | 381/92 |
| 2015/0245158 A1* | 8/2015 | Vilermo | H04S 7/302 |
| | | | 381/303 |
| 2015/0296319 A1* | 10/2015 | Shenoy | G06T 7/557 |
| | | | 381/303 |
| 2015/0317981 A1* | 11/2015 | Yliaho | H04R 5/027 |
| | | | 381/26 |
| 2016/0044410 A1* | 2/2016 | Makinen | H04R 3/005 |
| | | | 381/26 |
| 2016/0057522 A1 | 2/2016 | Choisel et al. | |
| 2016/0086368 A1* | 3/2016 | Laaksonen | H04N 5/232945 |
| | | | 345/473 |
| 2016/0161588 A1 | 6/2016 | Benattar | G01S 3/80 |
| 2016/0299738 A1* | 10/2016 | Makinen | G06F 3/04883 |
| 2016/0373877 A1 | 12/2016 | Laitinen | H04S 7/304 |
| 2017/0366914 A1 | 12/2017 | Stein et al. | |
| 2018/0206054 A1 | 7/2018 | Laitinen et al. | H04S 7/303 |

FOREIGN PATENT DOCUMENTS

| | | |
|---|---|---|
| JP | 2009243894 A | 10/2009 |
| WO | WO 2017/085562 A2 | 5/2017 |
| WO | WO-2018/064296 A1 | 4/2018 |
| WO | WO-2017/073324 | 8/2018 |

OTHER PUBLICATIONS

Nix, J., et al., "Sound source localization in real sound fields based on empirical statistics of interaural parameters", Jan. 2006, The Journal of Acoustical society of America, abstract only, 1 pg.

3GPP TR 26.918 V15.0.0 (Sep. 2017), "3$^{rd}$ Generation Partnership Project; Technical specification Group Services and Systems Aspects; Virtual Reality (VR) media services over 3GPP (Release 15)", pp. 23-29 (Section 4.3), 33-36 (Section 4.3.5), 38-39 (Section 5.1), 45-46 (Section 5.11).

Gallo, Emmanuel, et al., "3D-Audio Matting, Postediting, and Rerendering from Field Recordings", EURASIP Journal on Advances in Signal Processing, vol. 2007, Article ID47970, 2007, 16 pages.

Pihlajamaki, Tapani, et al., "Synthesis of Complex Sound Scenes with Transformation of Recorded Spatial Sound in Virtual Reality" Journal of the Audio Engineering Society, vol. 63, No. 7/8, Jul./Aug. 2015, pp. 542-551.

Hansen, Martin Weiss, et al. "Localizing Near and Far Field Acoustic Sources With Distributed Microphone Arrays", IEEE 2014 48$^{th}$ Asilomar Conference on Signals, Systems and Computers, Nov. 2, 2014, pp. 491-495.

Kowalczyk, K., et al., "Parametric Spatial Sound Processing: A flexible and efficient solution to sound scene acquisition, modification, and reproduction", Mar. 1, 2015, IEEE Signal Processing Magazine, vol. 32, No. 2, 12 pgs.

Song, M., et al., "Personal 3D Audio System with Loudspeakers", Jul. 19, 2010, Multimedia and Expo (ICME), 2010, IEEE International Conference, Piscataway, NJ, USA 6 pgs.

\* cited by examiner

DETERMINATION OF TARGETED SPATIAL AUDIO PARAMETERS AND ASSOCIATED SPATIAL AUDIO PLAYBACK

CROSS REFERENCE TO RELATED APPLICATION

This patent application is a U.S. National Stage application of International Patent Application Number PCT/FI2018/050445 filed Jun. 13, 2018, which is hereby incorporated by reference in its entirety, and claims priority to GB 1710085.0 filed Jun. 23, 2017.

FIELD

The present application relates to apparatus and methods for time-frequency domain audio distance estimation, but not exclusively for time-frequency domain audio distance estimation for six degree of freedom spatial processing applications.

BACKGROUND

Capture of audio signals from multiple sources and mixing of audio signals when these sources are moving in the spatial field requires significant effort. For example the capture and mixing of an audio signal source such as a speaker or artist within an audio environment such as a theatre or lecture hall to be presented to a listener and produce an effective audio atmosphere requires significant investment in equipment and training.

A commonly implemented system is where one or more 'external' microphones, for example a Lavalier microphone worn by the user or an audio channel associated with an instrument, is mixed with a suitable spatial (or environmental or audio field) audio signal such that the produced sound comes from an intended direction.

The general field of the technology is spatial sound capture from OZO or a similar capture device or a group of capture devices. In particular there is known and implemented spatial sound capture which, for a dedicated decoder, enables 3 degrees of freedom (3DOF) audio reproduction using headphones, a head-mounted display (HMD), and a computer (or any similar configuration such as a smart phone attached to a VR mount).

The 3DOF consists of 3 orthogonal rotations. Sensors in present HMDs can provide this 3DOF information to existing systems such as OZO Software Suite or YouTube 360. The user can then rotate the head to view different angles of the captured VR content.

From existing VR games it is evident that 6DOF greatly improves the immersion to the VR environment. 6DOF video capture and reproduction for other VR/MR/AR applications is thus expected. While audio-only 6DOF is technically possible, it is expected that a typical situation will involve both video and audio being captured and reproduced in 6DOF. Thus where 6DOF video reproduction is enabled, it is necessary to also enable 6DOF audio reproduction, or the overall experience may be distracting. For example not implementing a 6DOF audio system while implementing a 6DOF video system may result in hearing the sound of a talker arriving a direction other than where the talker is seen. In VR reproduction, it is critical to have matching auditory and visual perception, since hearing is used to orientate the viewing direction when the source is not in the field of view.

With respect to FIG. 1, there is shown the effect of 3DOF and 6DOF implementations in a VR playback implementation of captured content. In these examples the user 103 perceives the world through a head-mounted display (with the ability to perform 6DOF tracking) and headphones. In the first example, shown by the left part of the figure, a typical 3DOF reproduction system is shown, which does not allow the translation for captured VR content. A user in such a system is located at the centre position 101 and can experience change where a rotation of the head-mounted display is detected causing a change in the direction of arrival of the perceived audio signal and the image. However any user translational movement does not affect the audio or visual scene which creates an unnatural world for the user where the environment seems to move along with the user movement.

The centre part of FIG. 1 shows an example wherein 6DOF video is enabled, however audio is only enabled for 3DOF. In this case, the user can move in the VR world. This with respect to visual perception produces a more natural world, however, the further the distance 105 the user 103 moves from the centre point 101, the greater the discrepancy between auditory perception 106 and visual scene perception 104.

This would result in deteriorated perceived spatial audio quality. Especially, as in the case in FIG. 1 a 3DOF binaural rendering is performed together with 6DOF video rendering, the lack of 6DOF audio rendering decreases the level of naturalness, and may even create a situation that the video and the audio sources are perceived to be separate sources (e.g., if a person is speaking, the speech is not perceived to originate from the mouth, but instead as a separate "floating" source). Furthermore, if the sound is perceived at a different direction than the visual source, the user of the VR content may have difficulty to orientate to the right direction when the visual source is out of the field of view.

The right part of FIG. 1 shows an example wherein 6DOF is enabled for both audio and video. This produces a reproduction similar to natural viewing/listening.

It is possible using video capture to generate a depth map to determine the distance of the visual scene from the capture device, and use this information to move the nearby visual objects differently than the far-away objects according to the viewer/listener translation, hence enabling 6DOF video rendering.

FIG. 2 illustrates the amount the user translation affects the angle and the amplitude (of the direct sound component) of a sound source. Thus for example the left graph 201 shows the plot of angle correction against movement measured in terms of source distance where a first plot 205 shows a motion in the direction of the source (and thus no correction is needed) and a second plot 207 where a perpendicular motion requires correction. Furthermore the right graph shows the plot of amplitude correction against movement measured in terms of source distance where a first plot 215 shows a motion in the direction of the source (and where correction is needed as the sound source is approached/retreated from and thus should be perceived as being louder/quieter) and a second plot 217 where a perpendicular motion requires correction.

As such it is understood that not only a 6DOF audio reproduction system is required to prevent a mismatch when 6DOF video is implemented but in order to determine the required amount of angle/amplitude correction for 6DOF reproduction a distance estimate between the 'sound source' and the capture device is required.

Current audio capture methods determine spatial metadata, such as directions and energy-ratios associated with sounds, but not distances. In other words, the angle of the arriving sound is known, but not the position where it originates. The lack of distance metadata means that only 3DOF rendering can be performed where only the head rotation can be taken into account.

In video games or studio-mixed object-based spatial sound content the source positions (i.e., their angles and distances) are known, and thus 6DOF rendering is readily available.

However, the state-of-the-art parametric spatial audio capture methods enable analysis of direction(s) and other parameters in frequency bands, but not distances.

Methods to estimate the distance parameter in frequency bands have been proposed. However, they are not optimal in all scenarios. For example the determination of sound distance from video depth maps has been proposed in US 2015/0296319. The method estimates a direction of arrival (DOA) in frequency bands, and selects the distance from the visual depth map accordingly. However these distances may be suboptimal in circumstances such as when the fluctuating DOA points at a direction where the depth-map does not recognize the desired source, and when the depth map itself has excessive noise.

Hence, methods providing accurate distance in frequency bands in all acoustical conditions using only one microphone array are needed.

SUMMARY

There is provided according to a first aspect an apparatus for spatial audio signal processing, the apparatus comprising at least one processor configured to: determine at least one direction parameter for at least one frequency band based on microphone signals received from a microphone array; process the determined at least one direction parameter to determine at least one distance parameter for the at least one frequency band; and enable an output and/or store of the at least one distance parameter, at least one audio signal, and the at least one direction parameter.

The processor configured to determine at least one direction parameter for at least one frequency band based on microphone signals received from a microphone array may be configured to perform one of: receive the at least one direction parameter for at least one frequency band based on microphone signals received from a microphone array; and calculate the at least one direction parameter for at least one frequency band based on microphone signals received from a microphone array.

The processor configured to process the determined at least one direction parameter to determine at least one distance parameter for the at least one frequency band, may be configured to: process at least two of the determined direction parameters to determine a fluctuation between the at least two of the determined direction parameters; and determine the at least one distance parameter based on the fluctuation between the at least two of the determined direction parameters.

The processor configured to process at least two of the determined direction parameters to determine a fluctuation between the at least two of the determined direction parameters may be configured to perform one of: determine a circular variance of vectors based on the at least two of the determined direction parameters; determine a time smoothed circular variance of vectors based on the at least two of the determined direction parameters; determine a frequency smoothed circular variance of vectors based on the at least two of the determined direction parameters; and determine a time and frequency smoothed circular variance of vectors based on the at least two of the determined direction parameters.

The processor configured to process at least two of the determined direction parameters to determine a fluctuation between the at least two of the determined direction parameters may be configured to apply a determined function to one of: the circular variance; the time smoothed circular variance; the frequency smoothed circular variance; the time and frequency smoothed circular variance, to determine the at least one distance parameter.

The processor configured to process the at least two of the determined direction parameters to determine a fluctuation between the at least two of the determined direction parameters may be configured to: accumulate over a time window a number of fluctuation estimates of the at least two of the determined direction parameters over at least one frequency band; determine at least one fluctuation estimate from the number of fluctuation estimates associated with a first distance parameter value; determine at least one further fluctuation estimate from the number of fluctuation estimates associated with a second distance parameter value, wherein the second distance parameter value is greater than the first distance parameter value; and determine a normalised distance parameter based on the at least one fluctuation estimate from the number of fluctuation estimates associated with a first distance parameter value and the at least one further fluctuation estimate from the number of fluctuation estimates associated with a second distance parameter value.

The processor configured to process the determined at least one direction parameter to determine at least one distance parameter for the at least one frequency band may be configured to: determine an environment room size; and map the normalised distance estimate associated with the environment to determine at least one distance parameter based on the environment room size.

The processor may be further configured to: determine a depth map; and determine a depth map based distance parameter based on the depth map, wherein the processor configured to process the determined at least one direction parameter to determine at least one distance parameter for the at least one frequency band is further configured to process the depth map based distance parameter and the at least one distance parameter for the at least one frequency band to determine a further at least one distance parameter for the at least one frequency band.

The processor configured to determine a depth map may be configured to perform at least one of: receive a depth map from a sensor; receive a depth map from a memory; and determine a depth map from at least two images captured by at least one camera, wherein the at least one camera is configured to capture the at least two images from separate space positions/orientations.

The processor configured to determine a depth map based distance parameter based on the depth map may be configured to: determine a search area based on the at least one direction parameter for at least one frequency band based on microphone signals received from a microphone array; and select a minimum distance from the depth map over the search area as the depth map based distance parameter.

The processor configured to determine a search area based on at least one direction parameter for at least one frequency band based on microphone signals received from a microphone array may be configured to: determine a base direction based on an average of the at least one direction parameter for at least one frequency band based on microphone signals received from a microphone array; and determine an extent of the search area from the base direction based on the fluctuation of the at least one direction parameter for at least one frequency band based on microphone signals received from a microphone array.

The processor configured to determine an extent of the search area from the base direction based on the fluctuation of the at least one direction parameter for at least one frequency band based on microphone signals received from a microphone array may be configured to determine the extent of the search area from the base direction based on the fluctuation of direction parameters based on microphone signals received from the microphone array over a range of frequency bands and/or a range of time periods.

The search area may be one of: a circular search area around the base direction defined by the extent of the search area from the base direction based on the fluctuation of the at least one direction parameter for at least one frequency band based on microphone signals received from a microphone array; and a rectangular search area around the base direction defined by the extent of the search area from the base direction based on the fluctuation of the at least one direction parameter for at least one frequency band based on microphone signals received from a microphone array.

The processor configured to process the depth map based distance parameter and the at least one distance parameter for the at least one frequency band to determine a further at least one distance parameter for the at least one frequency band may be further configured to merge the determined at least one distance parameter for the at least one frequency band and the depth map based distance parameter to determine the further at least one distance parameter for the at least one frequency band.

The processor configured to merge the determined at least one distance parameter for the at least one frequency band and the depth map based distance parameter to determine the further at least one distance parameter for the at least one frequency band may be configured to perform one of: select the maximum of the determined at least one distance parameter for the at least one frequency band and the depth map based distance parameter; and correct any errors within the at least one distance parameter for the at least one frequency band using the depth map based distance parameter, such that too small distance parameter from the determined at least one distance parameter for the at least one frequency band are corrected from the determined depth map based distance parameter.

The processor configured to determine at least one direction parameter for at least one frequency band based on microphone signals received from a microphone array may be configured to: receive the microphone signals from the microphone array for a time window; time-frequency transform the microphone signals from the microphone array for the time window; analyse the time-frequency transformed microphone signals from the microphone array for the at least one frequency band to determine at least one direction parameter for the at least one frequency band.

The at least one distance parameter for the at least one frequency band may be a distance parameter for the time window.

The processor may be further configured to determine an energy ratio parameter for the at least one frequency band based the time-frequency microphone signals from the microphone array for the at least one frequency band.

The at least one distance parameter for the at least one frequency band may be determined further based on the energy ratio parameter for the at least one frequency band based on the at least one direction parameter.

The processor may be further configured to associate/combine: the at least one direction parameter for at least one frequency band based on microphone signals received from a first microphone; the at least one energy ratio parameter for the at least one frequency band; the at least one distance estimate for the at least one frequency band; and at least one audio signal.

The processor may be further configured to output the association/combination of: the at least one direction parameter for at least one frequency band based on microphone signals received from a first microphone; the at least one energy ratio parameter for the at least one frequency band; the at least one distance estimate for the at least one frequency band; and at least one audio signal.

The at least one distance parameter and the at least one direction parameter may be provided as metadata associated with the at least one audio signal.

The processor configured to determine the at least one distance parameter may be configured to determine the at least one distance parameter relative to a defined position, wherein the defined position is defined with respect to the microphone array.

According to a second aspect there is provided an apparatus for spatially processing at least one audio signal, the apparatus comprising a processor configured to: receive the at least one audio signal; receive at least one direction parameter for at least one frequency band based on microphone signals received from a microphone array; receive at least one distance parameter for at least one frequency band based on microphone signals received from the microphone array; receive at least one user input defining a six-degrees-of-freedom parameter; process the at least one audio signal to generate a rendered output audio signal based on: the at least one user input; the at least one direction parameter; and the at least one distance parameter to enable a six-degree of freedom audio reproduction.

The at least one distance parameter may be determined from the at least one direction parameter for the at least one frequency band based on the fluctuation of the at least one direction parameter for the at least one frequency band.

The processor may be further configured to receive at least at least one energy ratio parameter associated with the at least one audio signal for the at least one frequency band, wherein the processor configured to process the at least one audio signal to generate a rendered output audio signal based on: the at least one user input; the at least one direction parameter; and the at least one distance parameter to enable a six-degree of freedom audio reproduction may be further configured to process the at least one audio signal based on the at least one energy ratio parameter.

The processor configured to process the at least one audio signal to generate a rendered output may be configured to: process the at least one direction parameter based on the six-degrees-of-freedom parameter and the at least one distance parameter to generate a processed direction parameter; determine a gain parameter based on the six-degrees-of-freedom parameter, the at least one direction parameter and the at least one distance parameter; spatially process at least part of the at least one audio signal based on the processed direction parameter to generate at least one rendered audio signal; and apply the gain to the at least one rendered audio signal to generate the rendered output audio signal.

The processor configured to process the at least one direction parameter based on the six-degrees-of-freedom parameter and the at least one distance parameter to generate a processed direction parameter may be configured to: translate the at least one direction parameter based on a six-degree-of-freedom position parameter and the at least one distance parameter by translating the at least one distance parameter and the at least one direction parameter into at least one position parameter, and determining an angle from the six-degree-of-freedom position parameter to the position parameter; and rotate the translated direction parameter based on a six-degree-of-freedom orientation parameter to generate the processed direction parameter.

The processor configured to determine a gain parameter based on the six-degrees-of-freedom parameter, the at least one direction parameter and the at least one distance parameter may be configured to: determine a translated distance based on the at least one direction parameter, the at least one distance parameter and the six-degree-of-freedom translation parameter; and generate a gain based on the at least one distance parameter divided by the translated distance.

The gain may be one of: greater than one; equal to one; and less than one.

The processor configured to spatially process at least part of the at least one audio signal based on the processed direction parameter to generate at least one rendered audio signal may be configured to: spatially process a directional portion of the at least one audio signal, the directional portion of the at least one audio signal defined by an energy ratio parameter.

The processor configured to receive at least one user input defining a six-degrees-of-freedom parameter may be configured to receive from a head mounted device at least: a head rotation parameter defining three-degrees-of-freedom; and a head position and/or translation parameter defining a further three-degrees-of-freedom.

The processor may be further configured to output the rendered output audio signal to at least one of: headphones; and a multi-channel amplifier.

According to a third aspect there is provided an apparatus comprising a processor configured to: determine at least one direction parameter for at least one frequency band based on microphone signals received from a microphone array; process the determined at least one direction parameter to determine at least one distance parameter for the at least one frequency band; and enable a store of the at least one distance parameter, at least one audio signal, and the at least one direction parameter; receive at least one user input defining a six-degrees-of-freedom parameter; process the at least one audio signal to generate a rendered output audio signal based on: the at least one user input; the direction parameter; and the distance parameter to enable a six-degree of freedom audio reproduction.

According to a fourth aspect there is provided a method for spatial audio signal processing, comprising: determining at least one direction parameter for at least one frequency band based on microphone signals received from a microphone array; processing the determined at least one direction parameter to determine at least one distance parameter for the at least one frequency band; and enabling an output and/or store of the at least one distance parameter, at least one audio signal, and the at least one direction parameter.

Determining at least one direction parameter for at least one frequency band based on microphone signals received from a microphone array may comprise one of: receiving the at least one direction parameter for at least one frequency band based on microphone signals received from a microphone array; and calculating the at least one direction parameter for at least one frequency band based on microphone signals received from a microphone array.

Processing the determined at least one direction parameter to determine at least one distance parameter for the at least one frequency band, may comprise: processing at least two of the determined direction parameters to determine a fluctuation between the at least two of the determined direction parameters; and determining the at least one distance parameter based on the fluctuation between the at least two of the determined direction parameters.

Processing at least two of the determined direction parameters to determine a fluctuation between the at least two of the determined direction parameters may comprise one of: determining a circular variance of vectors based on the at least two of the determined direction parameters; determining a time smoothed circular variance of vectors based on the at least two of the determined direction parameters; determining a frequency smoothed circular variance of vectors based on the at least two of the determined direction parameters; and determining a time and frequency smoothed circular variance of vectors based on the at least two of the determined direction parameters.

Processing at least two of the determined direction parameters to determine a fluctuation between the at least two of the determined direction parameters may comprise applying a determined function to one of: the circular variance; the time smoothed circular variance; the frequency smoothed circular variance; the time and frequency smoothed circular variance, to determine the at least one distance parameter.

Processing the at least two of the determined direction parameters to determine a fluctuation between the at least two of the determined direction parameters may comprise: accumulating over a time window a number of fluctuation estimates of the at least two of the determined direction parameters over at least one frequency band; determining at least one fluctuation estimate from the number of fluctuation estimates associated with a first distance parameter value; determining at least one further fluctuation estimate from the number of fluctuation estimates associated with a second distance parameter value, wherein the second distance parameter value is greater than the first distance parameter value; and determining a normalised distance parameter based on the at least one fluctuation estimate from the number of fluctuation estimates associated with a first distance parameter value and the at least one further fluctuation estimate from the number of fluctuation estimates associated with a second distance parameter value.

Processing the determined at least one direction parameter to determine at least one distance parameter for the at least one frequency band may comprise: determining an environment room size; and mapping the normalised distance estimate associated with the environment to determine at least one distance parameter based on the environment room size.

The method may further comprise: determining a depth map; and determining a depth map based distance parameter based on the depth map, wherein processing the determined at least one direction parameter to determine at least one distance parameter for the at least one frequency band comprises processing the depth map based distance parameter and the at least one distance parameter for the at least one frequency band to determine a further at least one distance parameter for the at least one frequency band.

Determining a depth map may comprise at least one of: receiving a depth map from a sensor; receiving a depth map from a memory; and determining a depth map from at least two images captured by at least one camera, wherein the at least one camera is configured to capture the at least two images from separate space positions/orientations.

Determining a depth map based distance parameter based on the depth map may comprise: determining a search area based on the at least one direction parameter for at least one frequency band based on microphone signals received from a microphone array; and selecting a minimum distance from the depth map over the search area as the depth map based distance parameter.

Determining a search area based on at least one direction parameter for at least one frequency band based on microphone signals received from a microphone array may comprise: determining a base direction based on an average of the at least one direction parameter for at least one frequency band based on microphone signals received from a microphone array; and determining an extent of the search area from the base direction based on the fluctuation of the at least one direction parameter for at least one frequency band based on microphone signals received from a microphone array.

Determining an extent of the search area from the base direction based on the fluctuation of the at least one direction parameter for at least one frequency band based on microphone signals received from a microphone array may comprise determining the extent of the search area from the base direction based on the fluctuation of direction parameters based on microphone signals received from the microphone array over a range of frequency bands and/or a range of time periods.

The search area may be one of: a circular search area around the base direction defined by the extent of the search area from the base direction based on the fluctuation of the at least one direction parameter for at least one frequency band based on microphone signals received from a microphone array; and a rectangular search area around the base direction defined by the extent of the search area from the base direction based on the fluctuation of the at least one direction parameter for at least one frequency band based on microphone signals received from a microphone array.

Processing the depth map based distance parameter and the at least one distance parameter for the at least one frequency band to determine a further at least one distance parameter for the at least one frequency band may comprise merging the determined at least one distance parameter for the at least one frequency band and the depth map based distance parameter to determine the further at least one distance parameter for the at least one frequency band.

Merging the determined at least one distance parameter for the at least one frequency band and the depth map based distance parameter to determine the further at least one distance parameter for the at least one frequency band may comprise one of: selecting the maximum of the determined at least one distance parameter for the at least one frequency band and the depth map based distance parameter; and correcting any errors within the at least one distance parameter for the at least one frequency band using the depth map based distance parameter, such that too small distance parameter from the determined at least one distance parameter for the at least one frequency band are corrected from the determined depth map based distance parameter.

Determining at least one direction parameter for at least one frequency band based on microphone signals received from a microphone array may comprise: receiving the microphone signals from the microphone array for a time window; time-frequency transforming the microphone signals from the microphone array for the time window; analysing the time-frequency transformed microphone signals from the microphone array for the at least one frequency band to determine at least one direction parameter for the at least one frequency band.

The at least one distance parameter for the at least one frequency band may be a distance parameter for the time window.

The method may further comprise determining an energy ratio parameter for the at least one frequency band based the time-frequency microphone signals from the microphone array for the at least one frequency band.

The at least one distance parameter for the at least one frequency band may be determined further based on the energy ratio parameter for the at least one frequency band based on the at least one direction parameter.

The method may further comprise associating/combining: the at least one direction parameter for at least one frequency band based on microphone signals received from a first microphone; the at least one energy ratio parameter for the at least one frequency band; the at least one distance estimate for the at least one frequency band; and at least one audio signal.

The method may further comprise outputting the association/combination of: the at least one direction parameter for at least one frequency band based on microphone signals received from a first microphone; the at least one energy ratio parameter for the at least one frequency band; the at least one distance estimate for the at least one frequency band; and at least one audio signal.

The at least one distance parameter, and the at least one direction parameter may be provided as metadata associated with the at least one audio signal.

Determining the at least one distance parameter may comprise determining the at least one distance parameter relative to a defined position, wherein the defined position may be defined with respect to the microphone array.

According to a fifth aspect there is provided a method for spatially processing at least one audio signal, comprising: receiving the at least one audio signal; receiving at least one direction parameter for at least one frequency band based on microphone signals received from a microphone array; receiving at least one distance parameter for at least one frequency band based on microphone signals received from the microphone array; receiving at least one user input defining a six-degrees-of-freedom parameter; processing the at least one audio signal to generate a rendered output audio signal based on: the at least one user input; the at least one direction parameter; and the at least one distance parameter to enable a six-degree of freedom audio reproduction.

The at least one distance parameter may be determined from the at least one direction parameter for the at least one frequency band based on the fluctuation of the at least one direction parameter for the at least one frequency band.

The method may further comprise receiving at least at least one energy ratio parameter associated with the at least one audio signal for the at least one frequency band, wherein the processor configured to process the at least one audio signal to generate a rendered output audio signal based on: the at least one user input; the at least one direction parameter; and the at least one distance parameter to enable a six-degree of freedom audio reproduction is further configured to process the at least one audio signal based on the at least one energy ratio parameter.

Processing the at least one audio signal to generate a rendered output may comprise: processing the at least one direction parameter based on the six-degrees-of-freedom parameter and the at least one distance parameter to generate a processed direction parameter; determining a gain parameter based on the six-degrees-of-freedom parameter, the at least one direction parameter and the at least one distance parameter; spatially processing at least part of the at least one audio signal based on the processed direction parameter to generate at least one rendered audio signal; and applying the gain to the at least one rendered audio signal to generate the rendered output audio signal.

Processing the at least one direction parameter based on the six-degrees-of-freedom parameter and the at least one distance parameter to generate a processed direction parameter may comprise: translating the at least one direction parameter based on a six-degree-of-freedom position parameter and the at least one distance parameter by translating the at least one distance parameter and the at least one direction parameter into at least one position parameter, and determining an angle from the six-degree-of-freedom position parameter to the position parameter; and rotating the translated direction parameter based on a six-degree-of-freedom orientation parameter to generate the processed direction parameter.

Determining a gain parameter based on the six-degrees-of-freedom parameter, the at least one direction parameter and the at least one distance parameter may comprise: determining a translated distance based on the at least one direction parameter, the at least one distance parameter and the six-degree-of-freedom translation parameter; and generating a gain based on the at least one distance parameter divided by the translated distance.

The gain may be one of: greater than one; equal to one; and less than one.

Spatially processing at least part of the at least one audio signal based on the processed direction parameter to generate at least one rendered audio signal may comprise: spatially processing a directional portion of the at least one audio signal, the directional portion of the at least one audio signal defined by an energy ratio parameter.

Receiving at least one user input defining a six-degrees-of-freedom parameter may comprise receiving from a head mounted device at least: a head rotation parameter defining three-degrees-of-freedom; and a head position and/or translation parameter defining a further three-degrees-of-freedom.

The method may further comprise outputting the rendered output audio signal to at least one of: headphones; and a multi-channel amplifier.

According to a sixth aspect there is provided a method comprising: determining at least one direction parameter for at least one frequency band based on microphone signals received from a microphone array; processing the determined at least one direction parameter to determine at least one distance parameter for the at least one frequency band; and enabling a store of the at least one distance parameter, at least one audio signal, and the at least one direction parameter; receiving at least one user input defining a six-degrees-of-freedom parameter; processing the at least one audio signal to generate a rendered output audio signal based on: the at least one user input; the direction parameter; and the distance parameter to enable a six-degree of freedom audio reproduction.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
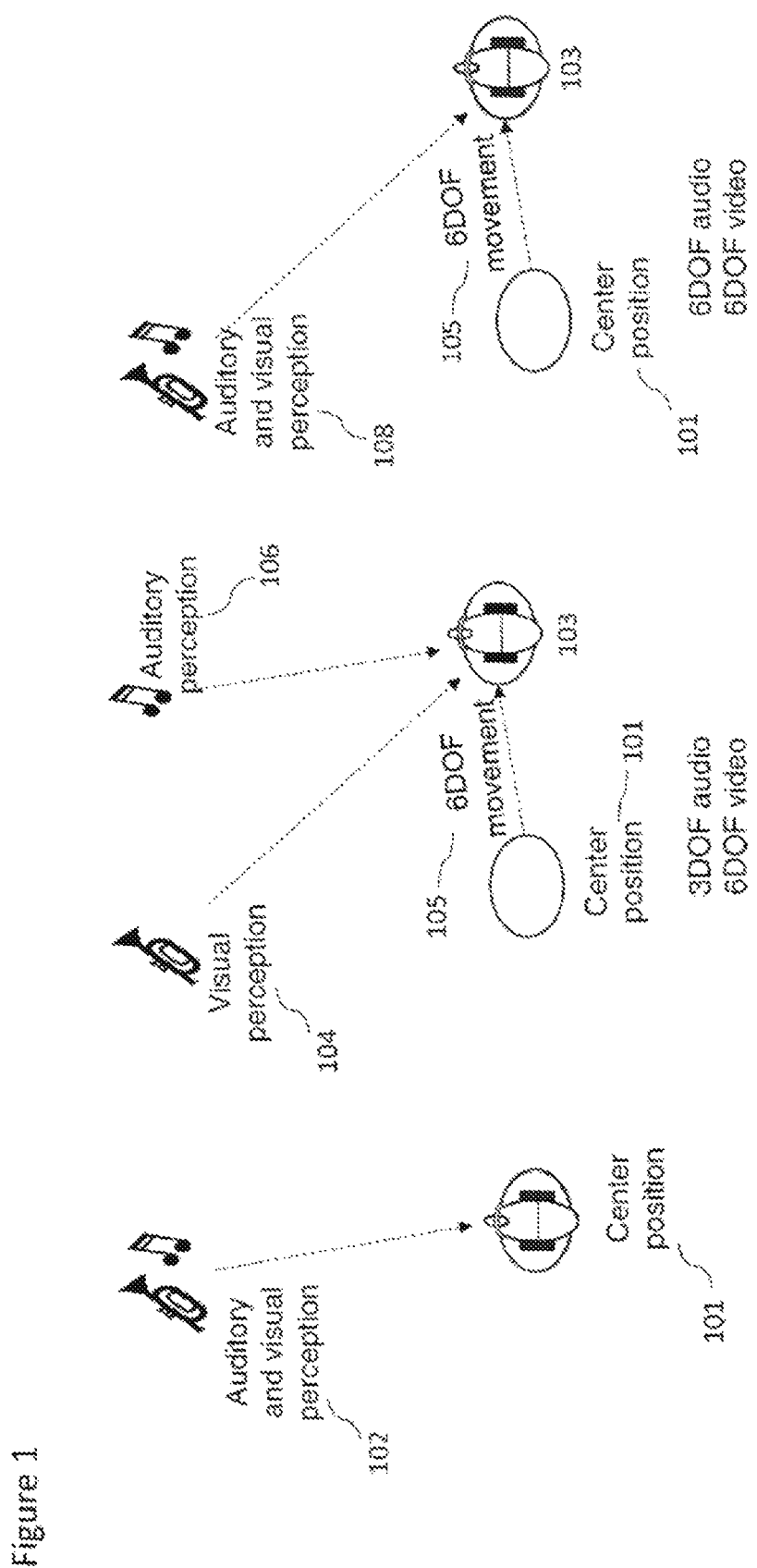
FIG. 1 shows schematically a 3DOF and 6DOF system.
Figure 2:
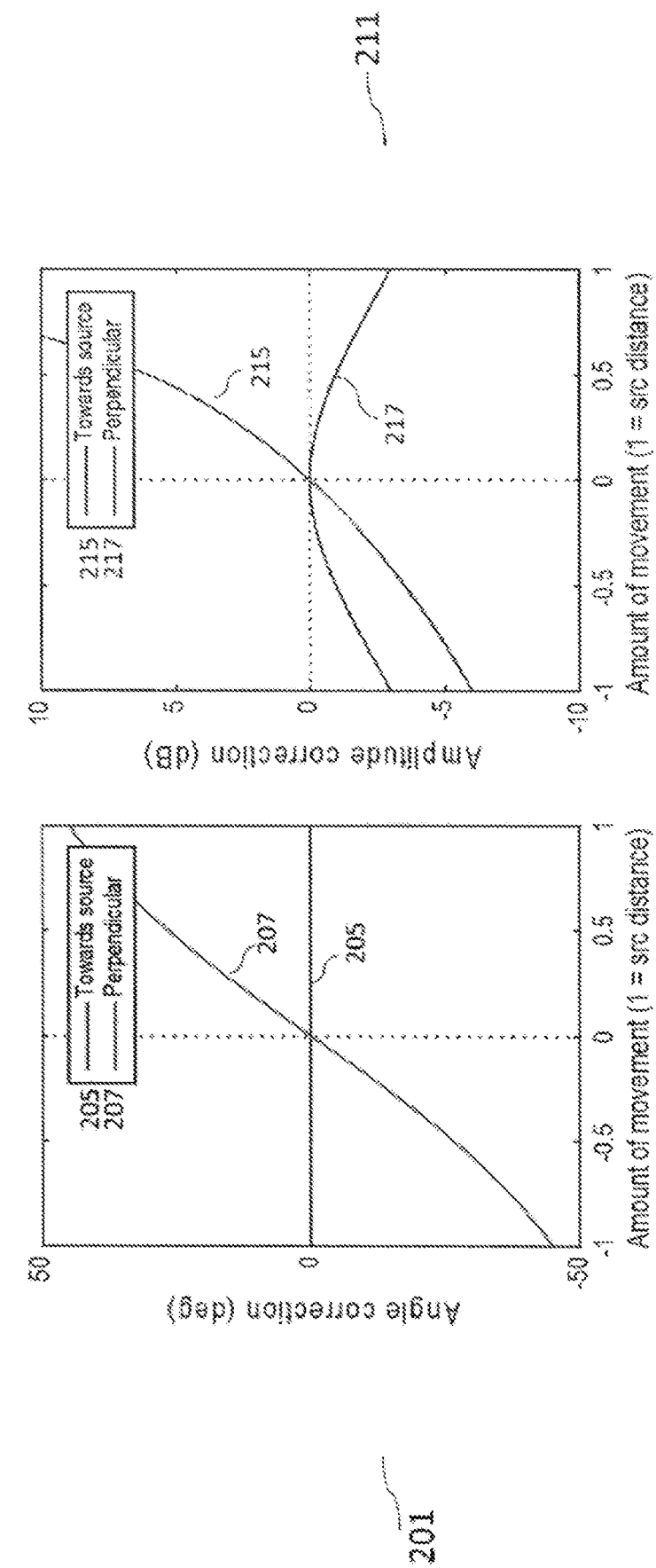
FIG. 2 shows example angle and amplitude corrections for 6DOF reproduction.

The following describes in further detail suitable apparatus and possible mechanisms for the provision of effective sound source distance determination from the capture of audio signals and the implementation of 6DOF audio synthesis.

As described previously utilization of rotation in 3DOF audio reproduction is already widely available in existing systems such as OZO Software Suite or YouTube 360. In such systems the user can rotate their head to view different angles to the captured Virtual Reality (VR) content.

As discussed above the focus of the following aspects is in captured sound (as opposed of studio-reproduced sound or game sound) from a microphone array such as that in OZO or in a smartphone. For such devices (or microphone arrays in general), parametric spatial audio capture methods may be used to enable a perceptually accurate spatial sound reproduction at the position of the capture device.

Parametric spatial audio capture refers to adaptive digital signal processing (DSP) driven audio capture methods. This typically means performing firstly an analysis of perceptually relevant parameters in frequency bands, for example, the directionality of the propagating sound at the recording position, and secondly reproducing spatial sound in a perceptual sense at the rendering side according to the estimated spatial parameters. The reproduction can be, for example, for headphones with support for head-orientation tracking. By estimating and reproducing the perceptually relevant spatial properties (parameters) of the sound field, a perception similar to that which would occur in the original sound field can be reproduced. As the result, the listener can perceive the multitude of sources, their distances, as well as properties of the surrounding physical space, among the other spatial sound features, as if the listener was in the position of the capture device.

Microphone arrays can be used to capture these spatial aspects. A known spatial-audio-reproduction method, called spatial audio capture (SPAC), processes captured microphone signals. It estimates the directions of arrival (DOA) and the ratios between direct and ambient components from the microphone signals in frequency bands, and synthesizes either binaural signals for headphone listening or loudspeaker signals for loudspeaker listening or Ambisonics to enable spatial audio reproduction in VR streaming services such as YouTube 360. In headphone listening, head-orientation tracking can be utilized in 3 degrees of freedom (3DOF) in order to enable head rotation.

The concept as discussed in further detail hereafter is thus an extension of SPAC (or parametric audio) capture and reproduction for 6-degree-of-freedom (6DOF) rendering. In other words, enabling movement within the captured sound scene.

The microphone arrays may be mounted on a VR camera, smart phone, or other devices. In a typical 3D spatial capture with elevation, each microphone array may consist of at least four microphones to have at least some spacing at all spatial axes. Higher end devices may feature microphone arrays with several hundred microphones.

The following provides methods and apparatus to enable determination of perceptually relevant distance parameter relating to the sound field at the recording position. The distance parameter may be used alongside such spatial audio systems as spatial audio capture (SPAC), Directional Audio Coding (DirAC), harmonic planewave expansion (harpex) and enable a six-degree-of-freedom controlled rendering of the sound field at the playback device.

The concept as discussed hereafter in detail is one of audio capture and synthesis for 6DOF rendering. As such this requires embodiments wherein the captured audio signals are analysed in frequency bands typically in terms of the direction (or directions) of the arriving sound and the proportions of the direct sound component(s) and the non-directional components.

In other words the concept is concerned with a method which utilizes a head position and orientation tracking input for a rendering, a distance parameter(s) in frequency bands from an audio capturing, and direction parameter(s) in frequency bands also from the audio capturing. In such situations these values may be then used to adjust the direction(s) and the gains (or energies) of the direct component(s) in frequency bands to enable the 6DOF audio reproduction of captured audio.

Adjusting the gains relates primarily to the movement towards or away from the determined direction of the arriving sound, and the adjustment of the direction(s) relate primarily to moving sideways with respect to the determined direction of the arriving sound.

The use case of the present disclosure is in particular the reproduction of microphone-array captured spatial sound (e.g. from an OZO device). In these cases the directional parameters in general do not necessarily point towards a direction of a particular sound source like in virtual worlds. Instead, the directional parameter determines the direction of the arriving sound in a perceptual sense. The sound in a frequency band can arrive, e.g., from a wall reflection, or the arriving sound in a frequency band can be a superimposition of several arriving sounds.

An aspect of this concept is that a property required for 6DOF audio rendering is the distance parameter to be captured in frequency bands. Thus a distance parameter is to be determined additionally to the previous determined spatial audio information. In some embodiments a solution is provided to estimate a distance parameter (or metadata) on a frequency band by band basis based on an analysis of the fluctuation of the directional parameter on a frequency band by band basis.

In some embodiments the distance determination may be performed with a VR capture device such as Nokia OZO (or any other microphone array) where the microphone signals are received/retrieved and then computer software is used to determine the directional and distance parameter estimation. In some embodiments the determination may be performed elsewhere such as within a capture device comprising at least one processor and software to perform the corresponding analysis. A further embodiment may be where the distance parameter is estimated at the decoder side based on the available other spatial parameters (e.g., directions).

In some embodiments the directional and distance parameters may be associated with the audio signals. For example in some embodiments the audio signals have an associated metadata bitstream or file which comprises the parameters and which can be stored or transmitted alongside at least one audio signal in any form (e.g., in an AAC format). The audio and the metadata may be stored or transmitted in a media container along with video, such as spherical video (with any means to enable 6DOF video rendering). The decoder can utilize the directional and distance metadata to enable 6DOF audio rendering at the decoder side using a suitable device such as described herein.

In the following embodiments the term defined position may be interpreted as a locus point or position from which the direction and/or distance is estimated. In some circumstances the defined position may be related to the microphone array. However any suitable position may be used. Furthermore in some embodiments there may be more than one defined position which are located relative to each other by defined distances and directions.

A further aspect of the concept as discussed in further detail hereafter is apparatus and methods for obtaining these distance parameters by merging two distance estimates. The first distance estimate may be based on only captured audio signal information (and use the methods as described herein) and a second distance estimate based on determining distances from video depth maps and using audio signal direction information.

The general idea is that as the two distance estimates are generated in a way that their potential errors are different, and thus estimates can be merged effectively, avoiding the problems of both estimation methods:

The embodiments as discussed in detail hereafter thus first determines a base direction for finding the distance from the depth map. The base direction is determined using the estimated DOA (which in some embodiments may be from the directional metadata) for a frequency band. The method may then determine a search area around the base direction, based on the fluctuation of the estimated DOA. After this, the distance may be estimated by applying a rule to the depth map such as selecting the minimum distance from the depth map inside the search area. Other selection/determination rules to generate the audio-video distance estimate from within the estimated area can also be applied.

The implementation exploits a bias of the potential errors in these estimates to a known direction. The real distance of the sound source may be behind the distance from the visual depth map, but it should not be closer. Hence, as the estimation errors are to a known direction, instead of being random, the errors can be taken into account when merging these estimates.

In some embodiments the combination of the distance estimates may be performed by taking the maximum of the two estimate types. In such embodiments taking the maximum is expected to be an effective method of merging as it reliably avoids distances estimated to be too close, which could result in perceivable artifacts (the closer the estimates are, the more processing is needed to yield accurate 6DOF rendering).

The merging furthermore should result in a final distance estimate for frequency bands, which is more accurate than the audio-only or the video-based metadata.

There are many advantages of the methods as proposed herein. Firstly it may be implemented using a single capture device. Secondly it may produce accurate distance estimates in variety of acoustical conditions. Thirdly it may produce accurate distance estimates despite noisy direction data and noisy depth maps (both of which are assumed to be potential issues in real-life scenarios).

Figure 3:
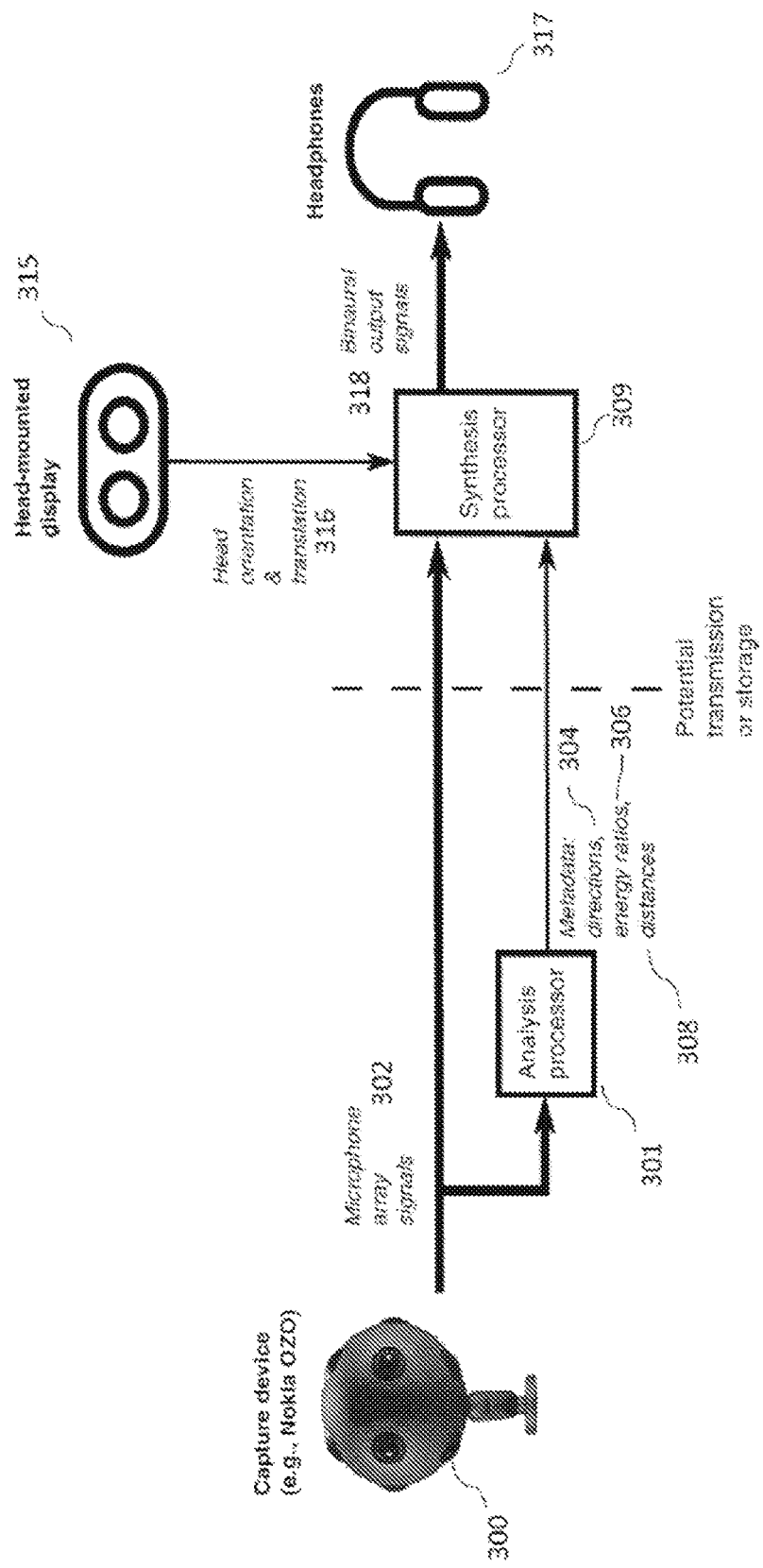
FIG. 3 shows a system of apparatus suitable for implementing some embodiments.

With respect to FIG. 3 an example apparatus and system for implementing embodiments of the application are shown.

In some embodiments the system comprises a capture device 300 in the form of a VR capture device. An example capture device 300 may be a Nokia OZO. However it is understood that in some embodiments the capture device 300 is any suitable apparatus comprising at least one microphone array configured to generate at least two audio signals (which are shown in FIG. 3 as the microphone array audio signals 302). Thus for example the capture device may be a mobile phone or user equipment with multiple microphones arranged as a microphone array.

In some embodiments the system comprises an analysis processor 301. The analysis processor 301 is configured to receive the microphone array audio signals 302 (from the capture device 300 or retrieved from memory or otherwise). The analysis processor 301 is configured to generate and output suitable parameters based on an analysis of the microphone array audio signals 302. The analysis processor 301 can, for example, be a computer (running suitable software), or alternatively a specific device utilizing, for example, FPGAs or ASICs. The analysis processor 301 in some embodiments may be integrated within the capture device 300 or may be implemented separate from the capture device 300. For example in some embodiments the analysis processor 301 may be implemented within servers within a distributed or cloud based system.

These parameters may comprise direction of arrival (DOA) parameters 304, energy ratios 306, and distances 308. In the following examples the term energy ratio can be the direct-to-total energy ratio. However it is understood that any suitable energy ratio associated with the direction of arrival parameter may be determined and used. For example in some embodiments the analysis processor 301 is configured to produce metadata on a frequency band by frequency band basis for: the direction-of-arrival (DOA) (azimuth: $\theta(k,n)$, and elevation: $\varphi(k,n)$), the direct-to-total energy ratio $r(k,n)$, and the distance $d(k,n)$ (where k is the frequency band and n is the temporal frame index).

In some embodiments, these parameters may then be associated with the microphone array audio signals 302. For example in some embodiments the analysis processor 301 may be configured to combine the analysis parameters 304, 306, 308 with the microphone array audio signals 302 such that the parameters are provided as metadata associated with the microphone array audio signals.

The parameters and the microphone array audio signals (or subset of the microphone signals) can be processed and reproduced with the same device, or they can be transmitted (or stored and later processed) using a different device configured to reproduce the audio signals and render the audio signals. The audio signals and parameters may thus be stored/transmitted in any suitable format such as an AAC format.

In some embodiments the system comprises a head mounted display (HMD) 315 configured to generate a head orientation and translation signal 316. The head orientation and translation signal 316 can in some embodiments indicate a suitable 6DOF signal representing both rotation and translation information. Although the HMD 315 is shown in FIG. 3 as generating both the head orientation and translation signal in some embodiments the head orientation and translation signal may be generated as separate head orientation and translation signals.

In some embodiments these signals may furthermore be generated by different devices. Thus for example the head orientation signal which features the rotation 3DOF information may be generated by a head tracker device mounted on a headset and the translation signal which features the translation 3DOF information may be generated by a body mounted or worn device (for example a user device in a pocket of the user) tracking the motion of the user.

Furthermore in some embodiments the rotation 3DOF and translation 3DOF information may be set by a user operating a suitable user interface (such as controlling a 'virtual' orientation and position using a touch interface on a tablet, mobile device or other computer).

In some embodiments of the system comprises a synthesis processor 309. The synthesis processor 309 is configured to receive, retrieve or otherwise obtain the microphone array audio signals 302 (or a suitable downmixed or selected channel and/or pre-processed version of the microphone array audio signals) and the analysis determined parameters (which may be in the form of metadata combined with the audio signals) in the form of estimated direction 304, energy ratio 306 and distance 308 parameters. Furthermore the synthesis processor 309 may be further configured to receive the head orientation and translation signals 316.

The synthesis processor 309 is configured to perform the synthesis (or decoding) part of the processing block. In other words the synthesis processor 309 is configured to process the received microphone array audio signals 302 based on the associated parameters, such as the directions 304, the energy ratio 306 and the distance 308 and furthermore based on the received head orientation and translation signal parameters 316 to generate a suitably rendered audio signal which may be output to an output device. For example as shown in FIG. 3 the synthesis processor 309 may be configured to generate a suitable binaural output audio signal 318 and pass this output to headphones 317. However in some embodiments the rendering may be made in any suitable multichannel output format. Furthermore in some embodiments the output may be a single channel audio signal with suitable side channel information for regenerating a multichannel audio signal format. For example a single channel and additional side information data may be generated which would be suitable for transmission over low data bandwidth channels.

In other words the synthesis block (which is shown in FIG. 3 as the synthesis processor 309) can be configured to utilize the directional and distance metadata to enable 6DOF audio rendering at the decoder side using any suitable device.

Figure 4:
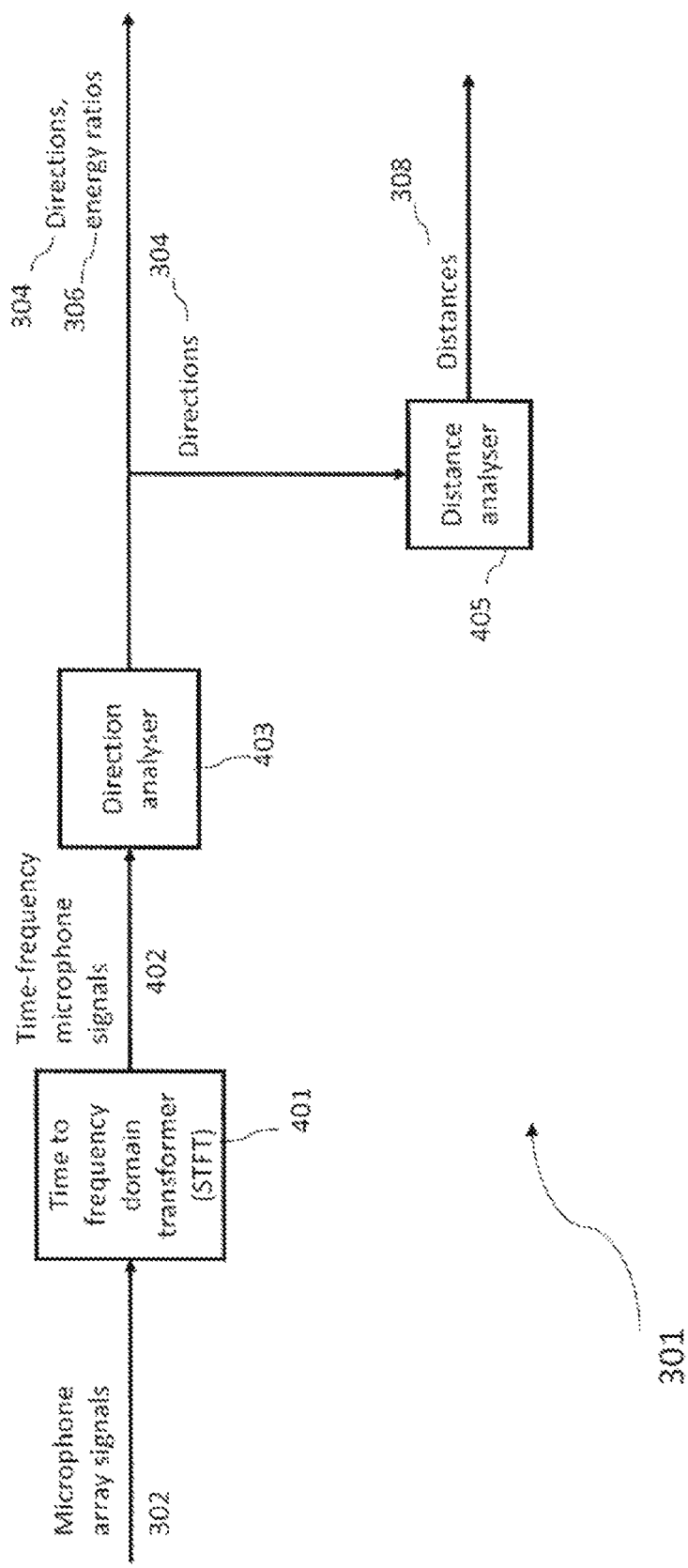
FIG. 4 shows schematically the analysis processor as shown in FIG. 3 according to some embodiments.

With respect to FIG. 4 an example analysis processor 301 (as shown in FIG. 3) according to some embodiments is described in further detail. The analysis processor 301 in some embodiments comprises a time-frequency domain transformer 401.

In some embodiments time to frequency domain transformer 401 is configured to receive the microphone array audio signals 302 and apply a suitable time to frequency domain transform such as a Short Time Fourier Transform (STFT) in order to convert the input time domain signals into a suitable frequency domain representation.

The frequency domain representation is divided into K subbands. Let us denote a time-domain microphone-array audio signals 402 as $x_m(t)$, where m is the microphone index and t is the time domain sample index. Thus for example the microphone array audio signals 302 may be represented in the time-frequency domain representation by $$X_m(b,n),$$

where b is the frequency bin index and n is the frame index. In another expression, n can be considered as a time index with a lower sampling rate than t. These frequency bins can be grouped into subbands that group one or more of the bins into a band index k=0, . . . , K−1. Each subband k has a lowest bin $b_{k,low}$ and a highest bin $b_{k,high}$, and the subband contains all bins from $b_{k,low}$ to $b_{k,high}$. The widths of the subbands can approximate any suitable distribution. For example the Equivalent rectangular bandwidth (ERB) scale or the Bark scale. The time-frequency microphone audio signals 402 can in some embodiments be output to a direction analyser 403.

In some embodiments the analysis processor 301 comprises a direction analyser 403. The direction analyser 403 may be configured to receive the time-frequency microphone audio signals 402 and based on these signal estimate direction of arrival (DOA) information. The estimation of the direction-of-arrival (DOA) based on the audio signals can be performed using any audio based DOA determination.

For example in some embodiments the analyser 403 is configured to estimate the direction with two channels. This represents the simplest configuration to estimate a direction of arrival, and can provide a direction estimate within an arc of 180 degrees in a single plane. More complex processing with more microphones can readily provide 360 degrees or 3D directional estimates. In the simple case of two microphones, the task is to find delay $\tau_b$ that maximizes the correlation between the two channels for subband b. This can be accomplished by creating time-shifted versions of the signal in channel 2, and correlating these with the signal on channel 1.

A time shift of $\tau$ time domain samples of $X_m(b,n)$, where m=2, can be obtained as $$X_{m,\tau}(b,n) = X_m(b,n)e^{-j\frac{2\pi b \tau}{N}},$$

where N is the length of the STFT operation. Now the optimal delay $\tau_k$ for band k (and time index n) is obtained from $$\max_{\tau_k} \sum_{b=b_{k,low}}^{b_{k,high}} \text{Re}(X^*_{2,\tau_k}(b,n)X_1(b,n)), \tau_k \in [-D_{max}, D_{max}]$$

where Re indicates the real part of the result and * denotes the complex conjugate. The range of searching for the delay $D_{max}$ is selected based on the estimated maximum time delay of sound arrival to two microphones. Knowing the physical distribution of the channel microphones then permits the direction analyser 403 to determine a first direction of arrival based on the delay. Assuming the analysis of the microphone pair to be in the horizontal plane, the delay $\tau_k$ can be translated into an angular value as $$\theta(k,n) = \cos^{-1}\left(\frac{\tau_k}{D_{max}}\right).$$

The analysis using two microphones represented a simplified case of determining the direction-of-arrival from two microphones. It has been previously shown that it is possible to have more than two microphones and more than one delay determination, and to utilize trigonometry to determine the direction of arrival in 3D. Furthermore, there are various known methods to determine the direction of arrival from a microphone array using other means than delay estimation. For example, estimating the direction of the sound field intensity vector can also be utilized with some arrays to provide an estimate of the direction of arrival.

The direction analyser 403 may thus be configured to provide a DOA for each frequency band and temporal frame, denoted as $(\theta(k,n), \varphi(k,n))$.

In some embodiments further to the DOA estimate the analyser 403 is configured to determine the ratio of the energy of the audio signal which can be considered to arrive from a direction. The direct-to-total energy ratio r(k,n) can be estimated, e.g., using a stability measure of the directional estimate, or using any correlation measures such as the correlation between the microphone audio signal, or any other suitable method to obtain a ratio parameter.

The estimated direction 304 and energy ratio 306 parameters may be output (to be used in the spatial synthesis). The parameters may, in some embodiments, be received in a parameter combiner (not shown) where the estimated direction and energy ratio parameters are combined with the distance parameters as generated by the distance analyser 405 described hereafter.

In some embodiments the analysis processor 301 comprises a distance analyser 405. The distance analyser 405 is configured to receive parameters (such as the direction 304 parameters on a frequency band-by-band basis) from the direction analyser 403.

The distance analyser 405 may be configured to estimate distances (for the estimated direction of arrival parameters) in relation to the capture device in frequency bands based on these directions. These distances may be output by the analysis processor 301. As described previously in some embodiments the analysis processor 301 is configured to combine the parameters and furthermore to associate (or further combine) the parameters to the microphone array audio signals. The distance analyser 405 in the following examples is configured to determine a distance estimate based on the fluctuation of a direction estimate parameter. The distance estimation is performed based on an assumption that, if a sound source is nearby, the direction estimate is relatively stable over time and/or frequency. On the contrary, if the sound source is far away, the direction estimate is assumed to fluctuate more due to more prominent reverberation and ambient sounds in relation to the direct sound component of the sound source.

Figure 5:
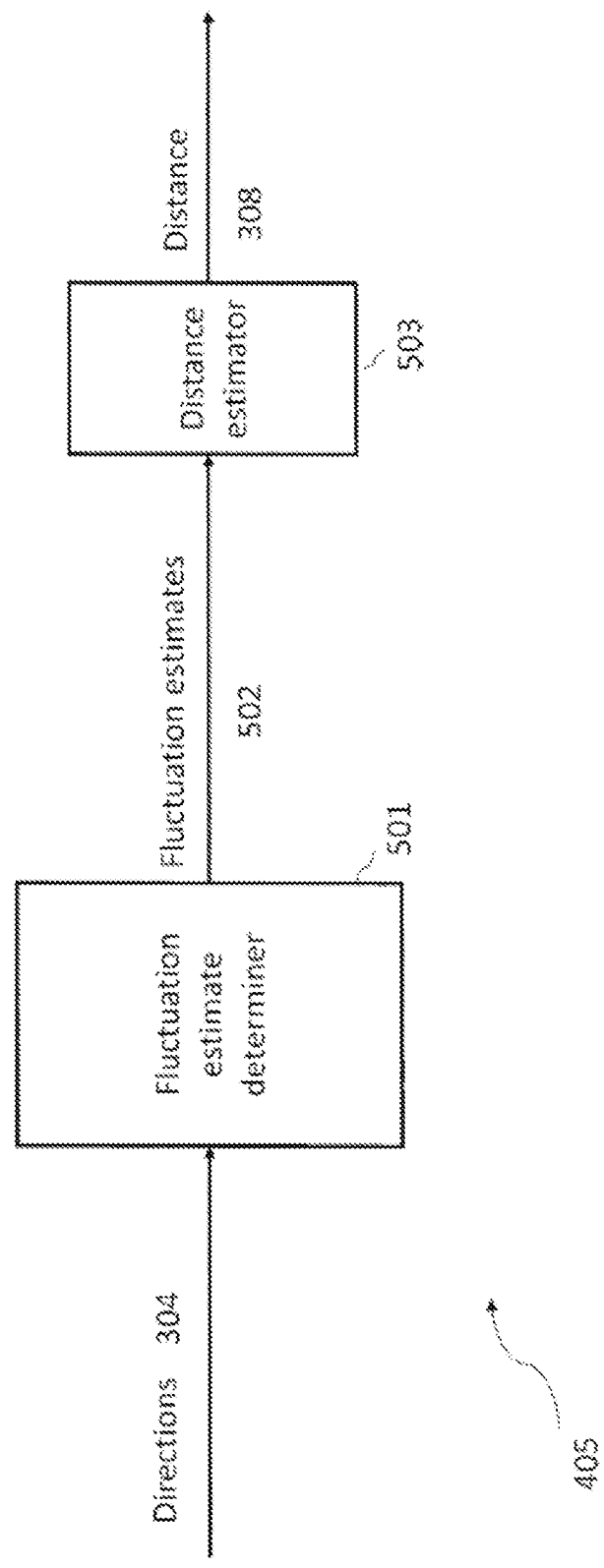
FIG. 5 shows schematically the distance analyser as shown in FIG. 4 according to some embodiments.

With respect to FIG. 5 an example direction based distance analyser 405 as shown in FIG. 4 is described in further detail. In some embodiments of the distance analyser 405 comprises a fluctuation estimate determiner 501. The fluctuation estimate determiner 501 is configured to receive the direction parameters 304 generated from the direction analyser 403.

The fluctuation estimate determiner 501 may be configured to determine an estimate of the amount of fluctuation in the direction estimate (or other parameter) by determining a circular variance, for example by $$s_1(k, n) = \left| \frac{1}{N} \sum_{m=0}^{N} v_{\theta(k,n-m)} \right|$$

where $v_\theta$ is a unit vector towards the direction $\theta$ and N is the number of used DOA estimates.

The fluctuation estimates may in some embodiments be low pass filtered or smoothed over time. An example of time smoothed fluctuation estimate may be, e.g., $s'(k,n)=a_1 s(k,n)+b_1 s'(k,n-1), s(k,n)>s'(k,n-1)$ $s'(k,n)=a_2 s(k,n)+b_2 s'(k,n-1), s(k,n) \leq s'(k,n-1)$ where for example $a_1=0.1$, $a_2=0.01$, $b_1=1-a_1$, and $b_2=1-a_2$. The fluctuation estimates may be necessary to be smoothed also over frequency, for example by $$s''(k, n) = \max_{k-1,k+1} s'(k, n)$$

The smoothed fluctuation estimate 502 may be passed to a distance estimator 503.

In some embodiments the distance analyser 405 comprises a distance estimator 503 which is configured to receive the fluctuation estimates 502 and based on the fluctuation estimates determine a distance output 308.

In some embodiments the distance estimate d(k,n) can be determined from s''(k,n) using the following:

$d(k,n)=c_3 s''(k,n)^3+c_2 s''(k,n)^2+c_1 s''(k,n)+c_0$ where the coefficients c can be determined or predetermined. For example in some embodiments the coefficients may be $c_3=-133.3, c_2=320, c_1=-259.7, c_0=72.2$ The distances d(k,n) 308 in some embodiments are passed to the output of the analysis processor 301.

The above example coefficients may estimate distances in a typical indoor condition. However, the above method may be changed in some other embodiments.

For example in some embodiments the fluctuation estimate s(k,n) is determined (in a manner similar as described above). However in some embodiments the distance estimator 403 may be configured to accumulate the fluctuation estimates and obtain statistical information specific to the acoustic environment. For example there may be different fluctuation characteristics for a same source at the same distance based on a room type. In other words the fluctuation characteristics for a small room may differ from the characteristics for a dry room, a reverberant room or a large room, different fluctuation characteristics may be observed.

Thus in some embodiments the distance estimator may use the accumulated data over time to determine which fluctuation characteristics determine a "short distance" and which determine a "long distance". In such embodiments a normalized distance parameter $s_{norm}(k,n)$ ranging between 0 and 1 can be determined. The normalized distance parameter can then be mapped to an actual distance parameter, for example, by determining the room size, e.g., from camera visual information, or from user input, or from other sources of information.

In other words, there are several ways to formulate the distance parameter based on the directional fluctuation to enable 6 DOF SPAC capture and reproduction.

As discussed earlier in some embodiments, the parameters (metadata) are transmitted along a set of audio signals, and the audio signals may themselves be encoded, e.g., using AAC. The parameters (metadata) may be embedded to the AAC stream or to a media container such as the mp4 container along with the video and the audio tracks. The parameters (metadata) as such may consist of directions, direct-to-total ratios, and the distance parameters, all of which determined in frequency bands. In some embodiments the parameters (metadata) can be quantized and encoded in a suitable way before embedding them to the media stream.

In some embodiments the distance analyser 405 is implemented as part of the decoder/synthesis processor 309. This enables the distance estimation to use the proposed fluctuation method without the microphone array signals (e.g., in the decoder side if only at least one audio signal and the directional parameters is available).

Figure 6:
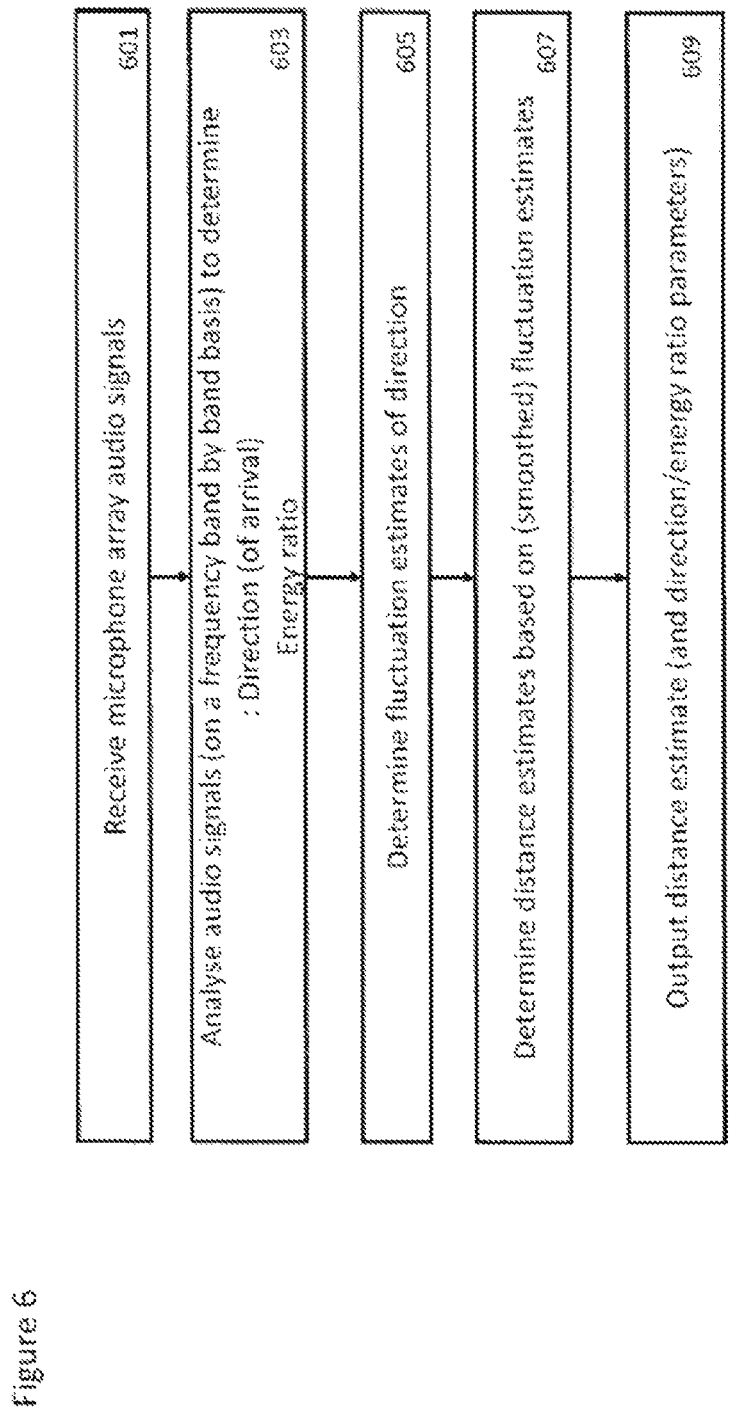
FIG. 6 shows a flow diagram of the operation of distance analyser as shown in FIG. 5 according to some embodiments.

With respect to FIG. 6 an example flow diagram showing the operation of the system shown in FIG. 3 and specifically the operation of the analysis processor 301 and the distance analyser 405 shown in FIGS. 4 and 5 respectively is described.

The first operation is one of receiving the microphone array audio signals. The operation of receiving the microphone array audio signals is shown in FIG. 6 by step 601.

The following operation is one of analysing the audio signals on a frequency band-by-band basis to determine parameters and specifically with respect to the distance determination the direction of arrival (or direction) parameters.

The operation of determining the direction parameters is shown in FIG. 6 by step 603.

The next operation is one determining fluctuation estimates of the direction parameters.

The operation of determining fluctuation estimates of the direction parameters is shown in FIG. 6 by step 605.

After determining the fluctuation estimates of the direction parameters the distance estimate may then be determined based on the fluctuation estimates. As discussed previously in some embodiments the fluctuation estimate may be smoothed or filtered to prevent jittery distance estimates being determined.

The operation of determining a distance estimate based on the fluctuation estimates is shown in FIG. 6 by step 607.

The distance estimate may then be output.

The output of the distance estimate is shown in FIG. 6 by step 609.

As discussed herein in some situations the acoustic properties of the environment may cause issues with an audio only estimation of the distance. As the capture device may be equipped with a camera or cameras in some embodiments the visual aspect of the invention may be used to assist in the determination of the distance estimate.

Figure 7:
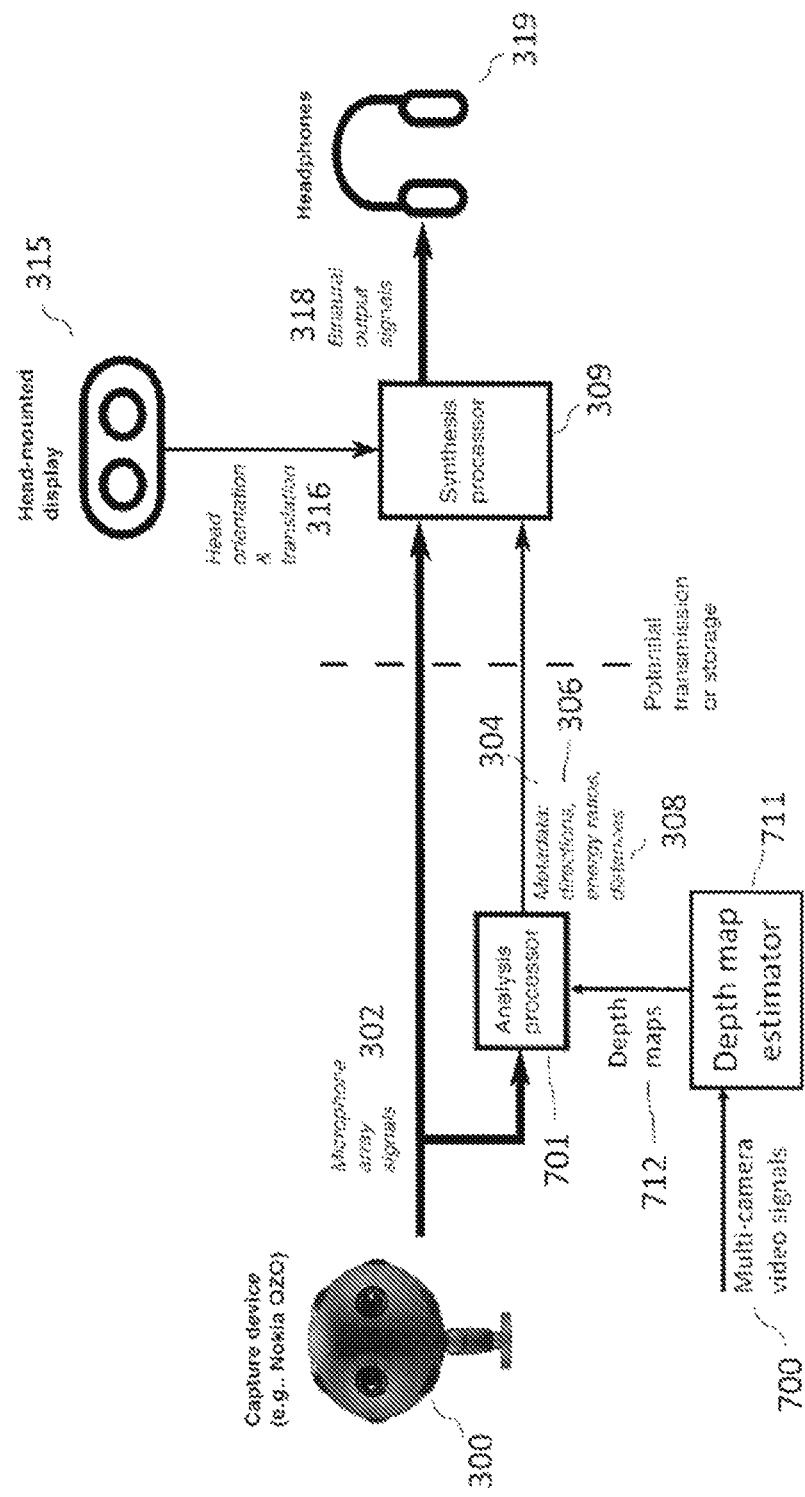
FIG. 7 shows a further system of apparatus suitable for implementing some embodiments.

With respect to FIG. 7 a further example apparatus and system for implementing embodiments of the application wherein the distance estimate may be determined using additional depth map data is described. Where components similar to those described in FIG. 3 are shown the reference number has been maintained.

In some embodiments the system comprises a capture device 300. The capture device 300 may be any suitable apparatus comprising at least one microphone array configured to generate at least two audio signals (which are shown in FIG. 7 as the microphone array audio signals 302) and at least one camera configured to provide images (which are shown as the multi-camera video signals 700) suitable for generating a depth map. Thus for example where the capture device is a Nokia OZO the device may comprise a microphone array comprising multiple microphones configured to generate at least two audio signals and multiple cameras configured to generate a multi-camera video signal. It is also understood that in some embodiments the capture device may be a mobile phone equipped with multiple microphones arranged as a microphone array and at least two cameras which are separated by a known distance and configured to capture images. In the mobile phone or mobile device implementation the device may be configured to capture images as the device is moved around and image processing used to stich the images together to generate the VR 360 degree image. Furthermore in some embodiments the capture device may comprise infra-red (IR) or near-IR (N-IR) cameras and/or illumination sources which may be used to generate depth map specific information. Alternately in some embodiments the capture device comprises at least one distance or depth sensor which is configured to generate a depth or distance value directly such as a time-of-flight or phase difference based distance sensor.

Thus as shown in FIG. 7 the capture device 300 may be configured to generate the microphone array audio signals 302 and also multi-camera video signals 700.

In some embodiments the system comprises a depth map estimator 711. The depth map estimator 711 is configured to receive the multi-camera video signals 700 and generate a suitable depth map 712 or depth maps based on these multi-camera video signals 700. In some embodiments these depth maps may be generated by analysing images from different cameras from the multi-camera arrangement and determining a depth map from differences within the images.

As discussed above the depth map can originate directly from other sensors than cameras capturing visible light. For example in some embodiments the depth map estimator may receive an output from a light field camera or other sensor such as a time-of-flight (light or ultrasound) or phase-difference distance sensor.

In some embodiments the system comprises an analysis processor 701. The analysis processor 701 is configured to receive the microphone array audio signals 302 (from the capture device 300 or retrieved from memory or otherwise) and furthermore the depth map information 712 from the depth map estimator 711 (or retrieved from memory or otherwise). The analysis processor 701 is configured to generate and output suitable parameters based on an analysis of the microphone array audio signals 302 and the depth map 712. The analysis processor 701 as described previously with respect to the analysis processor 301 may be implemented in a range of ways including a computer (running suitable software), or alternatively a specific device utilizing, for example, FPGAs or ASICs.

These parameters may comprise direction of arrival (DOA) parameters 304, energy ratios 306, and distances 308. For example in some embodiments the analysis processor 701 is configured to produce directional metadata on a frequency band by frequency band basis for: the direction-of-arrival (DOA) (azimuth: θ(k,n), and elevation: φ(k,n)), the direct-to-total energy ratio r(k,n), and the distance d(k,n) (where k is the frequency band and n is the temporal frame index).

In some embodiments, these parameters may then be associated with the microphone array audio signals 302. For example in some embodiments the analysis processor 301 may be configured to combine the analysis parameters 304, 306, 308 with the microphone array audio signals 302 such that the parameters are provided as metadata associated with the microphone array audio signals.

The parameters and the microphone array audio signals (or subset of the microphone signals) can be processed and reproduced with the same device, or they can be transmitted (or stored and later processed) using a different device configured to reproduce the audio signals and render the audio signals. The audio signals and parameters may thus be stored/transmitted in any suitable format such as an AAC format. Furthermore in some embodiments the audio signals and the metadata may be potentially stored or transmitted in a media container along with video, such as spherical video (with any means to enable 6DOF video rendering).

The system as shown in FIG. 7 onwards from the analysis processor is the same as the system and apparatus as shown in FIG. 3. Thus in some embodiments the system comprises a head mounted display (HMD) configured to generate a head orientation and translation signal 313 and a synthesis processor 309 configured to perform the synthesis (or decoding) part of the processing block and pass a suitable rendering to an output such as the headphones 317 shown in FIG. 7.

Figure 8:
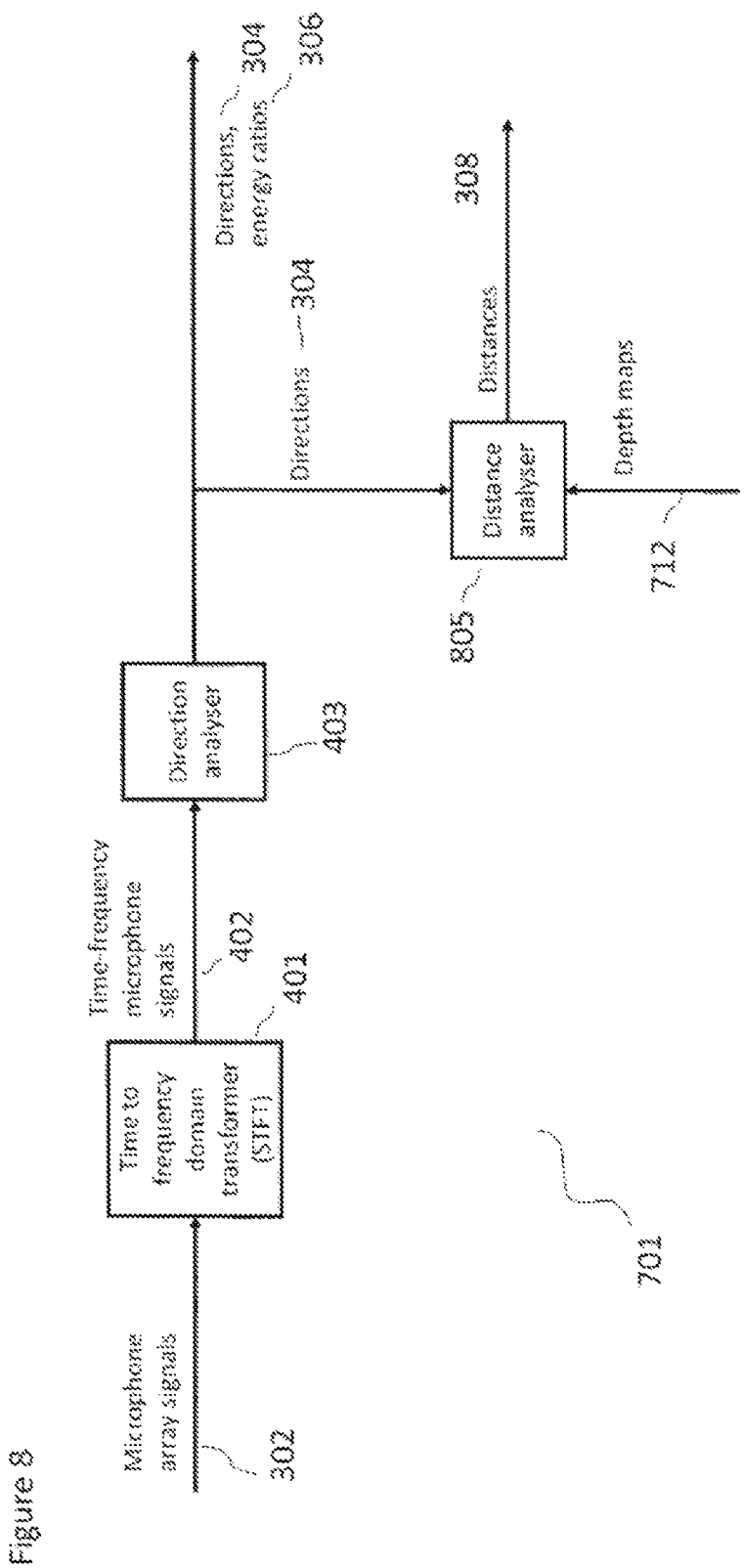
FIG. 8 shows schematically the analysis processor as shown in FIG. 7 according to some embodiments.

With respect to FIG. 8 an example analysis processor 701 (as shown in FIG. 7) according to some embodiments is described in further detail. The analysis processor 701 in some embodiments comprises a time-frequency domain transformer 401 and direction analyser 403.

The time to frequency domain transformer 401 and direction analyser 403 may be similar to the same components described earlier with respect to the analysis processor 301 shown in FIG. 4.

The estimated direction 304 and energy ratio 306 parameters from the direction analyser 403 may, in a similar manner as described above, be output (to be used in the spatial synthesis). The parameters may, in some embodiments, be received in a parameter combiner (not shown) where the estimated direction and energy ratio parameters are combined with the distance parameters 308 as generated by the distance analyser 805 described hereafter.

In some embodiments the analysis processor 701 comprises a distance analyser 805. The distance analyser 805 is configured to receive the depth maps (either from the depth map estimator 711 or via a depth map sensor or from memory or otherwise) and furthermore the direction parameters (on a frequency band-by-band basis from the direction analyser 403).

The distance analyser 805 may be configured to estimate distances (associated with the estimated direction of arrival parameters) in relation to the capture device in frequency bands based on these directions and the depth maps. These distance parameters may be output by the analysis processor 701.

Figure 9:
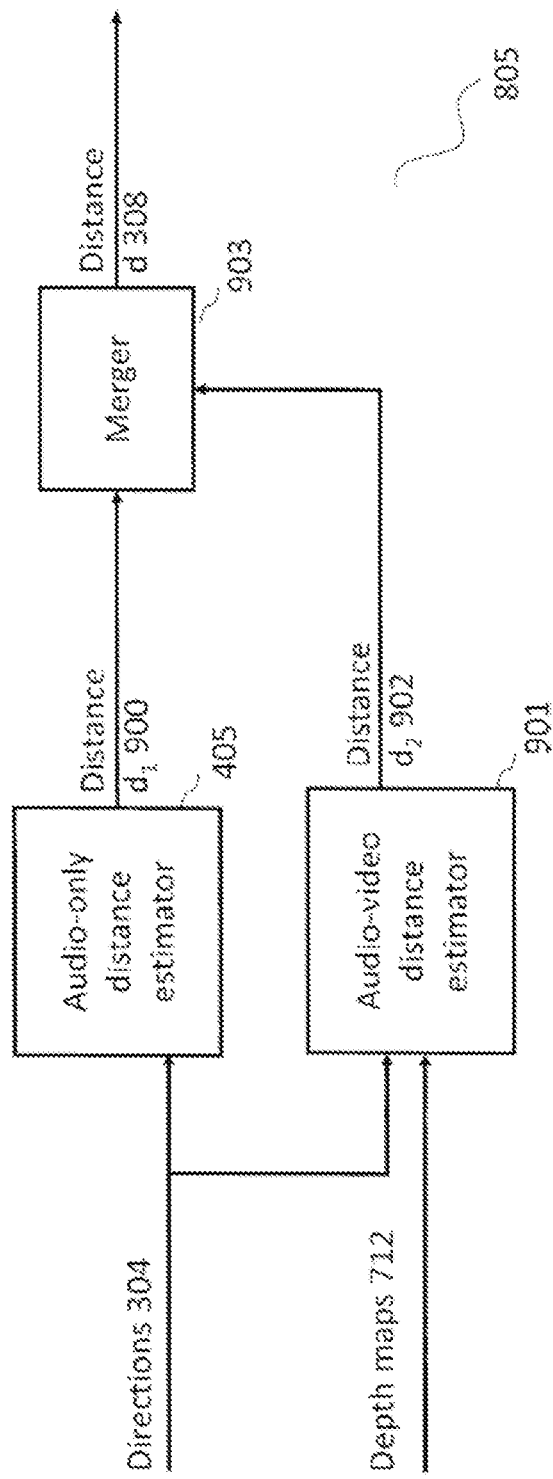
FIG. 9 shows schematically the distance analyser as shown in FIG. 8 according to some embodiments.

With respect to FIG. 9 an example distance analyser 805 as shown in FIG. 8 is described in further detail. In some embodiments the distance analyser 805 comprises an audio only distance estimator 405. The audio only distance estimator 405 is configured to receive the direction parameters 304 generated from the direction analyser 403 and generate a distance estimate 900 based only on the audio signal information and in a manner similar to that described above. For example in some embodiments the audio-only distance estimation is configured to provide the distance data $d_1(k,n)$ 900 in frequency bands based on the variance of the direction parameter.

These distance estimates 900 may then be passed to the merger 903.

In some embodiments the distance analyser 805 comprises an audio-video distance estimator 901. The audio-video distance estimator 901 is configured to receive the directions 304 from the direction analyser 403 and further configured to receive the depth maps 712. The audio-video distance estimator 901 is configured to generate audio-video distance estimates 902 and a pass these to the merger 903.

The audio-video distance estimator 901 in some embodiments uses the estimated direction parameters as an input to the depth map to get an estimate of the distance. In some embodiments this may be obtained by directly using the estimated direction ($\theta(k,n)$, $\varphi(k,n)$) and to fetch the corresponding distance from the depth map. However this is likely to produce noisy and incorrect distance estimates because as real spaces contain significant amount of reverberation and/or ambient sounds which effect the direction estimate, the direction estimate ($\theta(k,n)$, $\varphi(k,n)$) rarely points exactly to a 'sound source'. Thus the fetched distance from the depth map based on the direction estimate is most of the time erroneous.

In some embodiments the DOA may be averaged over frequency and/or time to account for the fluctuations caused by reflections and/or other ambient noise. Thus in some embodiments the estimated DOA ($\theta(k,n)$, $\varphi(k,n)$) is smoothed over frequency/time in order to mitigate noise in the estimates.

In some embodiments the smoothing is typically performed by averaging unit vectors $\upsilon_\theta(k,n)$ pointing to the directions ($\theta(k,n)$, $\varphi(k,n)$). The smoothing itself may in some embodiments be performed, e.g., using a first-order infinite impulse response (IIR) filter, or a Hann window filter.

The resulting smoothed DOA $\theta'(k,n)$, $\varphi'(k,n)$) may be used as a base direction.

Having determined the base direction the audio-video distance estimator 901 may be configured to determine the distances around this direction over which the depth map is to be examined. In other words to determine a search area around the (processed) direction parameter. This search area should be as small as possible, so that a minimum amount of wrong data is inside the search area, but should be large enough so that the correct distance can be found inside the search area.

In some embodiments the search area is a predetermined area. For example in some embodiments the area can be rectangular, so that the distances are searched inside the angles ($\theta'(k,n)\pm\alpha$, $\varphi'(k,n)\pm\alpha$), where a is a constant determining how large the searched area is. In some embodiments a may be 10 degrees. The search area may be any suitable shape and thus may be a shape other than rectangular. For example the search shape may be such that it aligns with the granularity of the depth map (especially where the depth map is not a regular grid or array arrangement).

In some embodiments the size of the search area may be determined adaptively. Thus for example in some embodiments the search area may be time-frequency dependent $\alpha(k,n)$.

In some embodiments the search area may be determined based on the 'reliability' of the DOA estimate. In some embodiments the amount of fluctuation in the estimated DOA can be used as a metric for the 'reliability'. For example $$s(k,n) = \left| \frac{1}{N} \sum_{m=0}^{N-1} v_{\theta(k,n-m)} \right|$$

The coefficient $s(k,n)$ can be used to determine the search area $\alpha(k,n)$, e.g., by $$\alpha(k,n) = \beta(1-s(k,n))+\gamma$$

where, e.g., $\beta=10$ degrees and $\gamma=5$ degrees.

In such embodiments this may effectively ensure that the area is large enough that the correct distance can be found, but it is small enough so that there is minimal amount of wrong data.

In some embodiments, having determined the search area the corresponding distances are determined from the depth map. A typical depth map may be a 2D projection of a 3D sphere, where each pixel corresponds to a certain spherical angle. The distance of each pixel inside the area ($\theta'(k,n)\pm\alpha(k,n)$, $\varphi'(k,n)\pm\alpha(k,n)$) is fetched, and the minimum of these distances is selected as the distance $d_2(k,n)$ 902 corresponding to the direction ($\theta(k,n)$, $\varphi(k,n)$).

In other words in some embodiments the audio-video distance estimator 901 may be configured select the shortest possible distance for a time-frequency tile within the search area and output this as the distance estimate $d_2$ 902.

In summary the audio-video distance estimator 901 may therefore be configured to first estimate the area where the sound may have originated, and then select the shortest visual object there is. This is expected to thus mean that the estimated distance $d_2(k,n)$ should be equal to or less than the actual distance $d(k,n)$.

In some embodiments the distance analyser 805 comprises a merger 903. The merger 903 may be configured to receive the audio only distance estimate $d_1$ 900 and the audio-video distance estimate $d_2$ 902 and combine or merge these distance estimates to generate a combined distance estimate d 308 which is more accurate than either of the audio only distance estimate $d_1$ 900 and audio-video distance estimate $d_2$ 902.

The combined distance estimate d 308 may then be output.

Thus for example in some embodiments the merger 903 is configured to combine the distance estimates $d_1(k,n)$ and $d_2(k,n)$ in manner which attempts to reduce the expected error. For example with respect to possible errors in $d_1(k,n)$ the practical error may be to any direction. For example where variance distance estimate method are used the error may produce an estimate which is too small or too large distance, depending on the acoustical conditions of the space. Thus if the space is very dry, the estimate may on average may produce too small a distance. On the other hand, $d_2(k,n)$ is expected to detect the nearest visual source at the search area, which can be utilized as a boundary condition for the distance estimation.

Thus in some embodiments the merger is configured to combine the distances by taking the maximum of the two estimates. In other words the merger may in some embodiments be configured to perform $$d(k,n)=\max(d_1(k,n), d_2(k,n))$$

Effectively, this operation corrects false estimates in $d_1(k,n)$ being closer than they actually are by using the $d_2(k,n)$ obtained from the visual data. In such a manner the quality of 6DOF rendering may be improved significantly, as the sound sources are perceived to be more stable in their correct positions when the listener moves their head.

Figure 10:
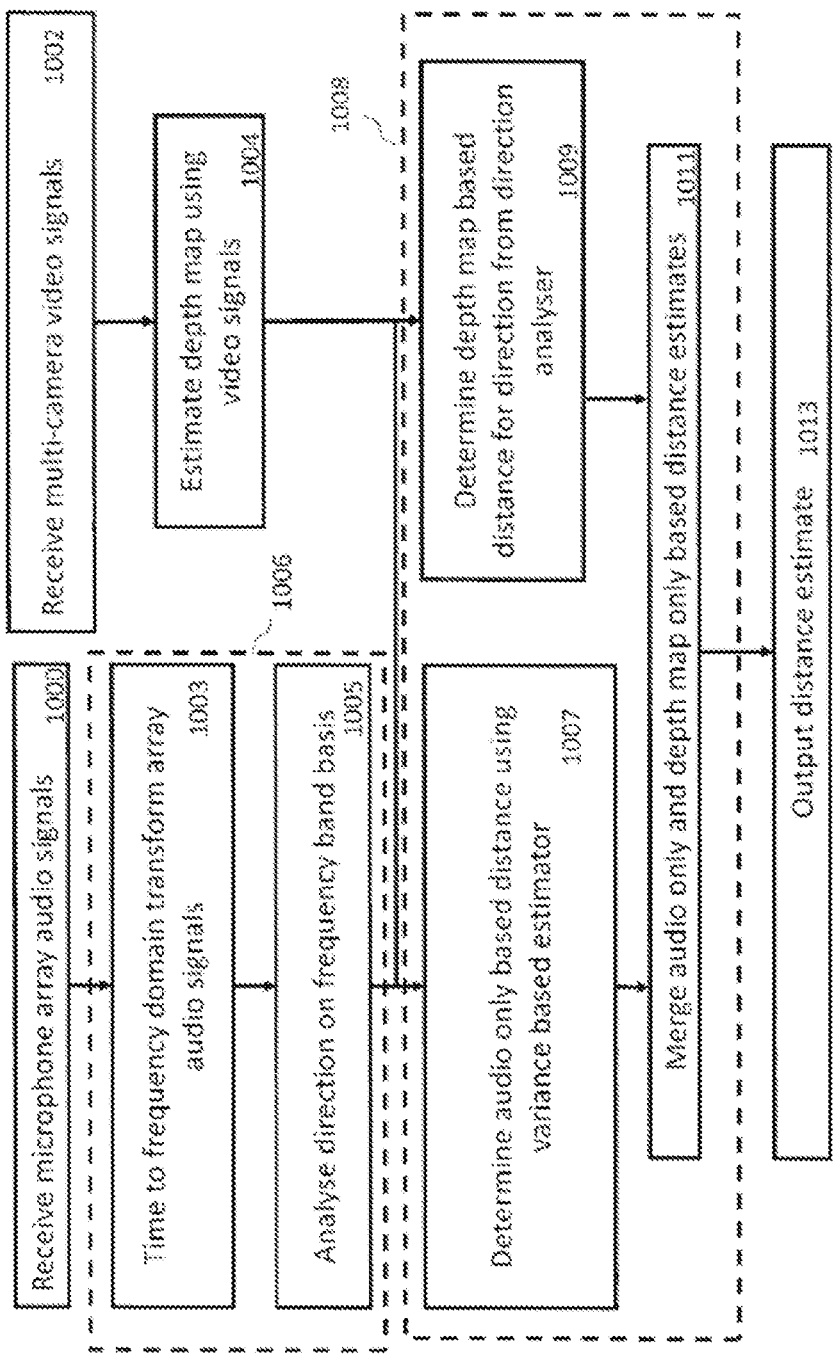
FIG. 10 shows a flow diagram of the operation of system shown in FIG. 7, the analysis processor shown in FIG. 8 and distance analyser as shown in FIG. 9 according to some embodiments.

With respect to FIG. 10 an example flow diagram of the operations show with respect to the apparatus shown in FIGS. 7 to 9 is described.

A first operation is to receive the microphone array audio signals.

The operation of receiving the microphone array audio signals is shown in FIG. 10 by step 1000.

Furthermore the method comprises receiving multi-camera video signals. The operation of receiving the multi-camera video signals is shown in FIG. 10 by step 1002.

With respect to the microphone array audio signals an analysis of the audio signals is performed to determine directions (and also energy ratios).

The analysis of the audio signals is shown in FIG. 10 by the dashed box 1006.

The analysis operation 1006 can be divided into two parts.

The first part is an operation of time to frequency domain transforming the array audio signals. The operation of time to frequency domain transforming the array audio signals is shown in FIG. 10 by step 1003.

The second part is an operation of analysing the audio signals to determine the directions on a frequency band-by-band basis (and also optionally determining the associated energy ratios). The operation of determining the directions on a frequency band-by-band basis is shown in FIG. 10 by step 1005.

Furthermore following receiving the multi-camera video signals there is an operation of estimating the depth map using the video signals.

The operation of estimating the depth map using the video signals is shown in FIG. 6 by step 1004.

Following the estimating of the depth map (from the video signals) and the directions (from the audio signals) there is shown a distance estimating operation based on both the audio and video signals.

The distance estimating operation is shown in FIG. 10 as the dashed box 1008. The distance estimating operation can itself comprise operations such as:

Determining an audio only based distance using the variance based estimate.

The operation of determining an audio only based distance using a various and based estimate is shown in FIG. 10 by step 1007.

A parallel (or contemporaneously determined) operation of determining a distance based on a depth map may be performed. This operation may further comprise the operation of determining a base direction, then determining a search area and then determining a distance from the depth map within the search area (such as selecting the minimum distance from the depth map within the search area).

The operation of determining a distance based on the depth map is shown in FIG. 10 by step 1009.

Having determined an audio only based distance estimate and the depth map based distance estimate the method may then comprise merging the estimates, for example by selecting the maximum of the two estimates for each frequency band.

The operation of merging the audio only and that the depth map based distance estimates is shown in FIG. 10 by step 1011.

Having merged the distance estimates the merged distance estimate may then be output.

The operation of outputting the distance estimate is shown in FIG. 10 by step 1013

The synthesis processor 309 (as shown in FIG. 3 and FIG. 7), may thus receive at least one audio signal originating from at least one microphone (the signal may also be pre-processed) and the associated parameters in frequency bands as input, and process these to generate a spatialized audio output (which may comprise at least two channels) in frequency bands using the parameters, the at least one audio signal, the tracked head rotation/orientation, and the tracked viewing position. It may be configured to generate this spatialized audio output where both the directional and distance metadata originate from the analysis of at least the signals of a microphone array in the captured sound field (such as that in a VR camera).

In other words, the audio scene may be reproduced by the synthesis processor such that it is configured to react to the user (listener's) movement and rotation, providing immersive 6DOF audio reproduction.

An example usage as described earlier is one where the audio signals had been captured with Nokia OZO, and are reproduced with a computer with a HMD and headphones, or a mobile phone attached to a Daydream View-type head mount. The HMD (or similar) is able to provide head rotation and position information. Software (in the computer or in the phone) may include processing algorithms utilizing the distance and direction metadata in frequency bands to adapt the audio signal spatialization. The media stream includes at least one channel of audio signal and the audio spatial metadata.

In some embodiments the media stream can be received from a video streaming service or any other source. The source of the media stream is configured therefore in some embodiments to provide the required directional and distance metadata. In some embodiments, and as described earlier the distance metadata is generated within the synthesis processor where the synthesis processor comprises a distance analyser similar to that described above. For example in some embodiments the synthesis processor comprises a distance analyser similar to the distance analyser 405 described above and configured to generate the distance estimates from the audio signals and/or direction parameters and/or depth maps.

In the above examples the audio based distance determination was based on the fluctuation parameter. However it is understood that in some embodiments, for example where the audio based distance determination is mixed with the image based distance determination, that the audio based distance determination may be any suitable distance determination method. For example in some embodiments the audio based distance determination may be based on other parameter estimates such as inter-microphone coherence. The proposed methods can be considered to be an extension of the spatial-audio processing method. As an input, the proposed method takes audio analysis derived parameters such as directions, direct-to-total energy ratios, and distances in frequency bands, and reproduction or playback derived parameters such as head orientation and translation parameters.

The processing method thus uses head position and orientation tracking, distance parameter(s) in frequency bands, and direction parameter(s) in frequency bands in order to adjust the direction(s) and the gains (or energies) of the direct component(s) in frequency bands to enable the 6DOF audio reproduction of captured audio.

In some embodiments adjusting the gains relates primarily to the movement towards or away from the determined direction of the arriving sound, and the adjustment of the direction(s) relate primarily to moving sideways with respect to the determined direction of the arriving sound.

As discussed previously the directional (and distance) parameters in general do not necessarily point towards a direction of (and distance to) a particular sound source like in virtual worlds. The sound in a frequency band can thus arrive from a wall reflection, or be a superimposition of several arriving sounds. The direction and distance estimates, which are estimated in frequency bands, thus reflect a prominent or averaged direction and a prominent or averaged distance at each temporal estimation interval.

Figure 11:
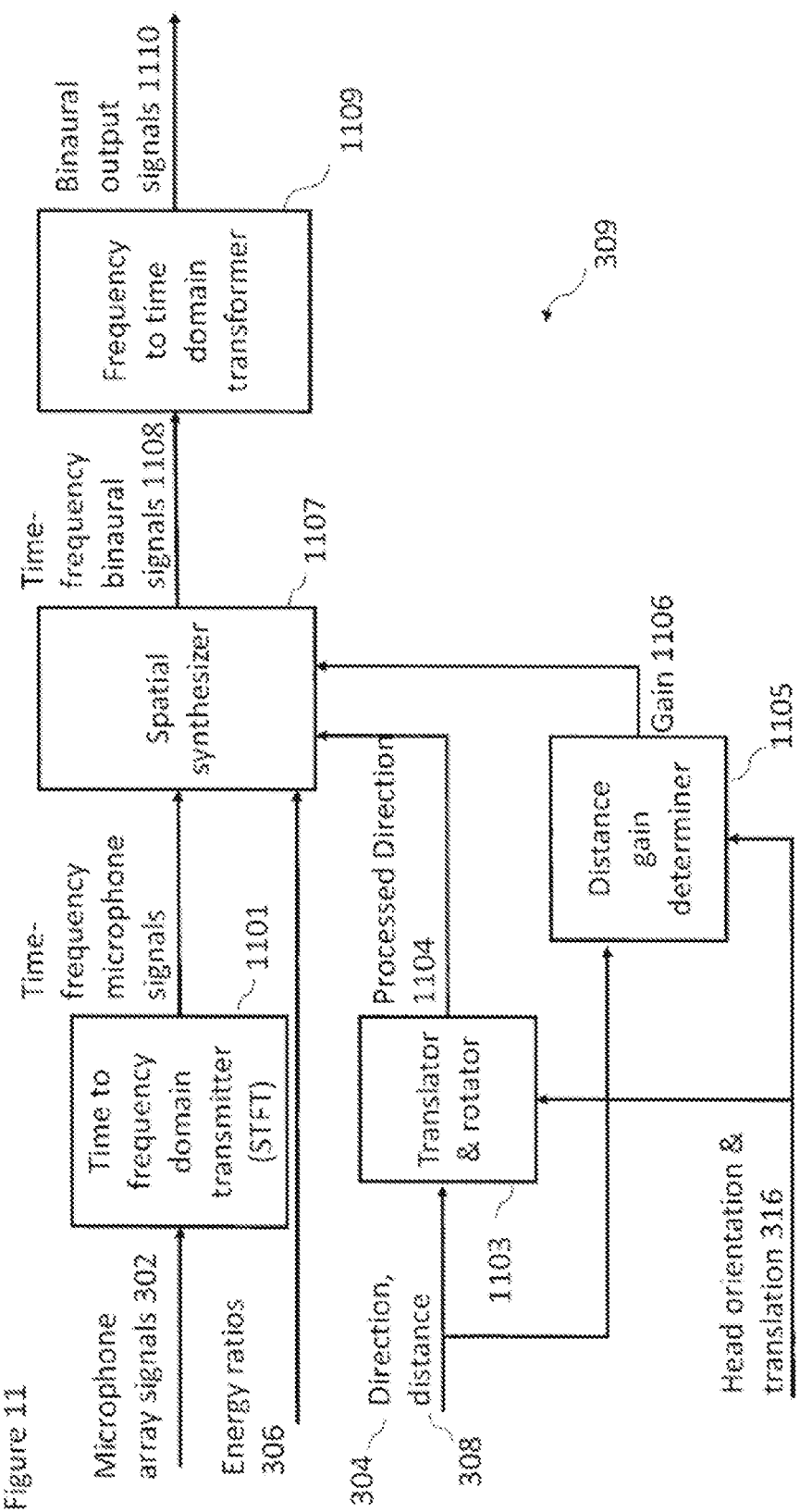
FIG. 11 shows schematically the synthesis processor shown in FIGS. 3 and 7 according to some embodiments.

An example synthesis processor 309, such as shown in FIGS. 3 and 7 suitable for performing 6DOF spatial audio rendering is presented in FIG. 11. The synthesis processor 309 can, for example, be a computer or a mobile phone (running suitable software), or alternatively a specific device utilizing, for example, FPGAs or ASICs. The input to the synthesis processor 309 is in some embodiments the microphone array audio signals 302 (which may be pre-processed), the direction parameters 304, the energy ratio parameters 306, and distance parameters 308, and the head orientation and translation parameters 316.

In some embodiments the synthesis processor 309 comprises a time to frequency domain transformer 1101. The time to frequency domain transformer 1101 is configured to receive the microphone array audio signals (or a pre-processed, selected channel or down-mixed version of the microphone array audio signals) and transformed into a time-frequency domain format. In some embodiments, as shown in FIG. 11, this may be achieved using a short-time Fourier transform (STFT). However any suitable transform may be used. The time to frequency domain transformer 1101 may then be configured to output the frequency domain transformed audio signals to a spatial synthesizer 1107.

In some embodiments the synthesis processor 309 comprises a translator and rotator 1103. The translator and rotator 1103 may be configured to receive the direction 304 and the distance 308 parameters (obtained for example from the metadata associated with the audio signals) as well as the head orientation and translation parameters 316 (obtained, for example, from an HMD). The translator and rotator 1103 may in some embodiments be configured to translate the directions based on the head position and the distances parameters.

In some embodiments this position translation may be performed using trigonometric determinations, for example, by translating the distance and direction parameters into a x, y, z position (or other co-ordinate system) in a defined space, and formulating the angle of a vector from the head position to the determined position.

Having translated the position, the translated directions may be rotated based on the head orientation. In a similar manner to the earlier operation this can be derived using trigonometric processing.

In such a manner the directions may be translated and rotated to produce a processed direction of arrival, which corresponds to the head position and orientation. The processed direction parameters can be forwarded to the spatial synthesizer 1107.

In some embodiments the synthesis processor 309 may comprise a distance gain determiner 1105. The distance gain determiner 1105 may be configured to receive the direction and the distance parameters alongside the head orientation and translation parameters 316. The distance gain determiner 1105 may be configured to determine frequency-dependent gains which are used to adjust the loudness due to head translation.

In some embodiments the distance gain determiner 1105 is configured to firstly, determine a translated distance d'(k,n). The translated distance can be determined using trigonometry from the original distance d(k,n) and the head translation parameters. After that, a gain factor g(k,n) may be estimated in frequency bands, for example by using the following expression:

$$g(k, n) = \frac{d(k, n)}{d'(k, n)}$$

The resulting gain parameters may be forwarded to the spatial synthesizer 1107.

In some embodiments the synthesis processor 309 may comprise a spatial synthesizer 1107. The spatial synthesizer 1107 may in some embodiments receive the energy ratios (without any modifications) and furthermore receive the time-frequency domain audio signals (from the time to frequency domain transformer), the processed direction 1104 from the translator and rotator 1103 and the gains 1106 from the distance gain determiner 1105.

The spatial synthesizer 1107 in some embodiments may be configured to operate in a manner similar to a conventional spatial synthesizer (such as a conventional SPAC), with two exceptions.

The spatial synthesizer 1107 in some embodiments may be configured to use the translated and the rotated directions as an input instead of the non-position tracked direction or only the rotated direction parameter. The processed (translated and rotated) direction parameters may be used as the input to a conventional spatial audio processing method with respect to positioning the directional part or component of the audio signal. The implementation of the rotated and translated direction enables the perceived sound to stay in the same place if the head is moved, enhancing the experience realism. The perceived ambient part of the synthesized spatial audio is not modified due to head translation, as it is assumed to be spatially distributed (in the same way as reverberation), and hence the effect due to head translation would be minimal.

The spatial synthesizer 1107 is further configured to adjust the loudness of the rendered sound. In some embodiments the frequency-dependent gain g(k,n) is used to amplify/attenuate the directional part (known as the mid-signal in some spatial audio capture systems). In some other embodiments, in which the rendering method uses an energy or covariance matrix domain approach to determine the spatial rendering, the gain parameter is applied as an energy multiplier $g^2(k,n)$ to increase or decrease the energy of the directional part (sound component). By doing this, the sound source is perceived to change loudness naturally when moving the head closer or further away from the sound source. Moreover, the direct-to-ambient ratio is affected as a consequence of the gain processing, yielding natural distance perception at the translated listener position.

In some embodiments it may be possible to take frequency-dependent air absorption into account, by modifying the gain-factor equation by a suitable frequency-dependent absorption coefficient. As shown in FIG. 11 the spatial synthesizer 1107 may be configured to produce binaural signal in the time-frequency domain 1108 as an output.

The example shown here is one example implementation and other implementations may be employed. For example in some further embodiments frequency band energies are adjusted based on the change of the distance and the direct-to-total-energy ratio, then the direct-to-total energy ratio is adjusted to match the new scenario where the sound is closer or further away than it originally was (without position tracking), and then the already gain-modified frequency band signals, and the modified ratio parameters are provided (along with any other parameters) to a spatial audio synthesis module to effectively provide the 6DOF performance.

In some embodiments the synthesis processor 309 may comprise a frequency to time domain transformer 1109. The frequency to time domain transformer 1109 or inverse time to frequency transformer may be an inverse STFT (in the case of STFT being used in the time to frequency transformer). The frequency to time domain transformer may thus generate time-domain binaural signals 1110 which may be passed to headphones or other suitable rendering equipment where the listener/user can listen to the 6DOF spatial audio.

Figure 12:
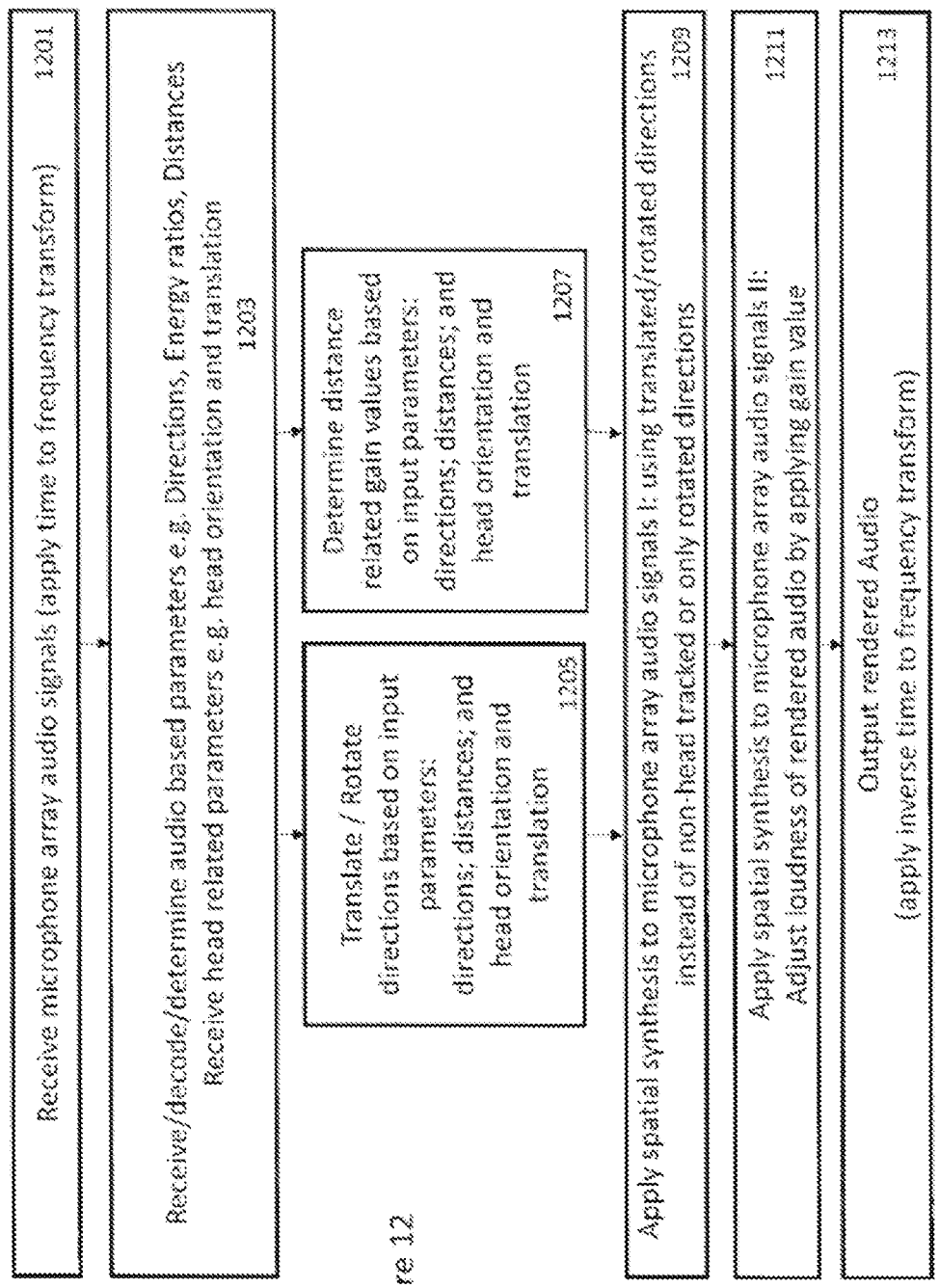
FIG. 12 shows a flow diagram of the operation of the synthesis processor shown in FIG. 11 according to some embodiments.

With respect to FIG. 12 an example flow diagram of the operation of the synthesis processor 309 is described.

In some embodiments the microphone array audio signals (or processed version thereof) is received. In some embodiments the audio signals may be processed and a time to frequency domain transform applied to generate suitable frequency domain representations of the audio signals suitable for frequency band based audio signal processing.

The operation of receiving the microphone array audio signals is shown in FIG. 12 by step 1201.

In some embodiments input parameters to the processor are received. For example the audio based parameters, such as directions, energy ratios and distances are furthermore received and/or decoded and/or determined (from the audio signals). Also the head related parameters such as head orientation and translation are also received.

The operation of receiving the audio based parameters and the head related parameters is shown in FIG. 12 by step 1203.

The directions may then be processed in order to translate and/or rotate the directions based on the input parameters.

The translation and/or rotation of the directions based on the input parameters is shown in FIG. 12 by step 1205.

Furthermore a distance related gain value is determined based on the input parameters.

The determination of gain values based on the input parameters is shown in FIG. 12 by step 1207.

The processor may in some embodiments be further configured to apply a first stage of the spatial processing using the translated/rotated directions applied to the direction part of the audio signal (instead of the non-head tracked or only rotated directions).

The operation of using the translated/rotated directions is shown in FIG. 12 by step 1209.

Furthermore in some embodiments the method furthermore applies the distance related gain to the direction part of the audio signal to adjust the loudness of the rendered audio.

The operation of applying the gain value to the audio signals (the directional part) is shown in FIG. 12 by step 1211.

The method then furthermore output the spatially processed (rendered) audio signal (and in some embodiments furthermore apply an inverse time to frequency transform).

The operation of outputting the spatially processed audio signal is shown in FIG. 12 by step 1213.

In implementing these embodiments the reproduction of captured sound can be made more immersive: the listener/user is able to move within the captured audio scene and perceive sound sources within the environment at their correct positions and distances. Thus, 6DOF captured audio reproduction becomes readily available when 6DOF video capture is enabled.

These embodiments may furthermore be integrated to existing parametric spatial-audio rendering methods that operate in the time-frequency domain. Hence, the 6DOF rendering can be performed efficiently, and with optimal audio quality.

Figure 13:
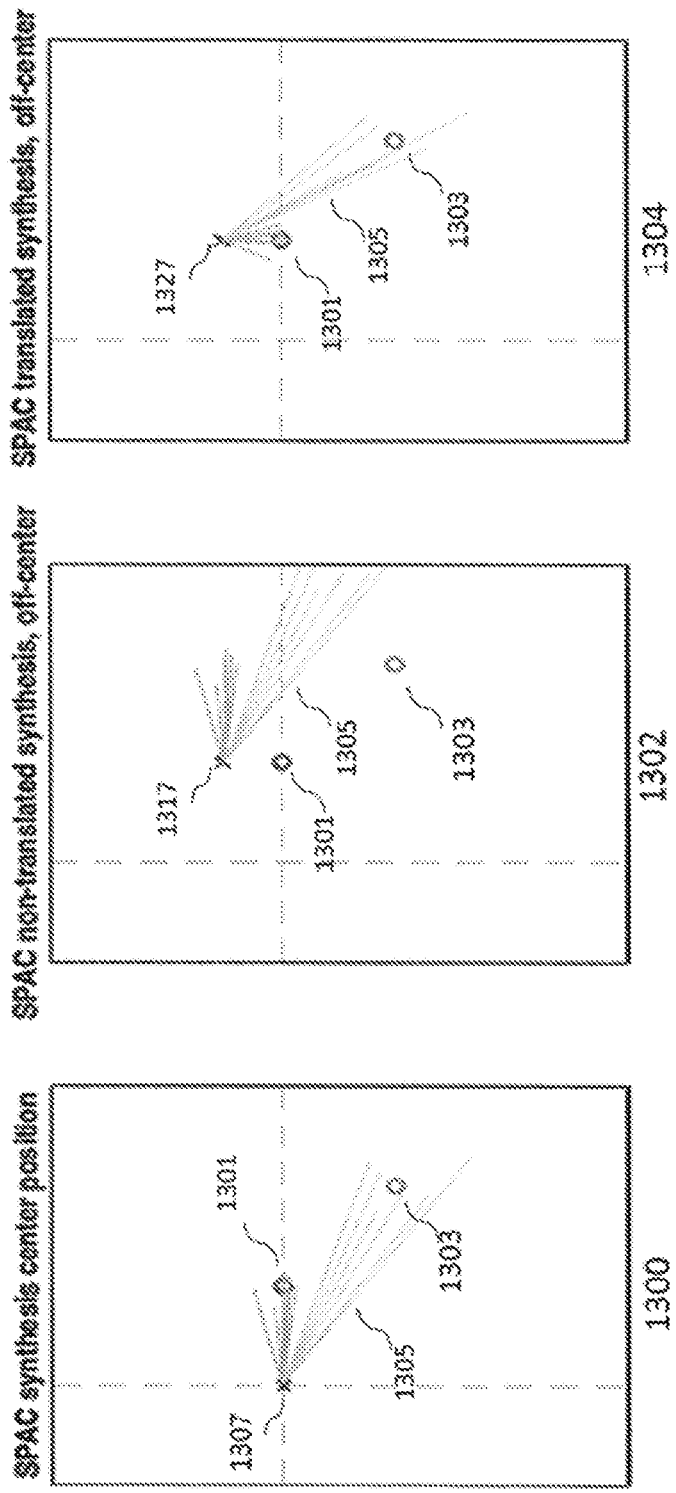
FIG. 13 shows example synthesis results performed by FIG. 12 according to some embodiments.

An example representation of a perceived 'sound source' when implementing the spatial processing embodiments as described herein is shown in FIG. 13. In this example there are two sources, source 1 1301, and source 2 1303, which are assumed to be spectro-temporally non-overlapping, i.e., they do not interfere the SPAC analyses of each other. Several lines represent the direction and distance (length of the line) analyses at different time-frequency intervals. The left side 1300 of the figure shows the reproduced estimated directions 1305 of the sound at the centre 1307 listening position. The centre 1302 of the figure shows the rendering with listener translation and rotation without using the estimated distance parameter where the listener 1317 and the directions 1305 do not align with the source 1301, 1303 positions. The right side 1304 of the figure shows the rendering with listener 1327 translation and rotation and with using distance parameter in frequency bands as described herein and thus the perceived audio directions 1305 are once again in alignment with the audio sources 1301, 1303. The advantage is thus that a 6DOF captured audio can be reproduced 6DOF, which is a necessity when 6DOF captured video is also enabled.

In the situation where the synthesis processing using distance parameter (along with the direction and ratio parameter) per time-frequency tile is not utilized, the 6DOF translation of the captured sound may result in off-centre positions as falsely perceived source positions such as shown in the middle of FIG. 13. This would be confusing for 360 VR reproduction, when the user cannot orientate the visual view according to the auditory spatial cues.

Again it is indicated that the context of the current disclosure is one of audio capture from microphone arrays, wherein the audio based parameters such as directions, ratios and distances are perceptual parameters, and do not necessarily reflect the actual physical organization of the sources within sound field, although they are analyzed using a device in that sound field.

Determining a distance has been shown in the examples above in a mathematical form. The mathematical approach provides a solution that can be implemented as a computer software determining the distance parameter. In other words, any descriptions about vector algebra or any other mathematical operations may refer only to the design process that results as program code. The program code itself may not need to contain all the described mathematical steps.

Figure 14:
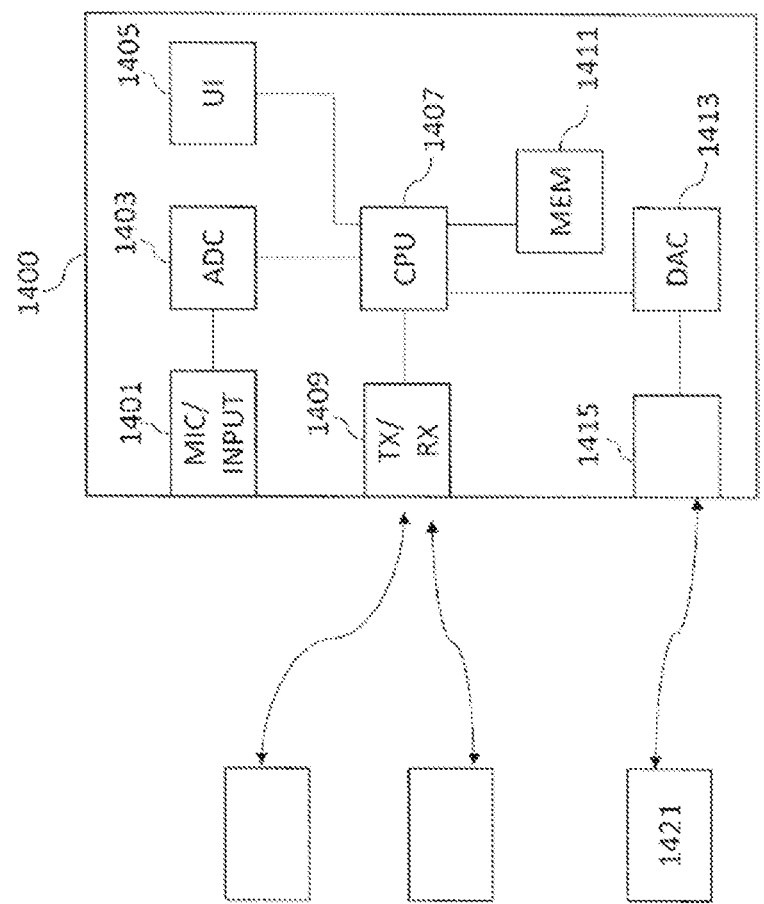
FIG. 14 shows schematically an example device suitable for implementing the apparatus shown in FIGS. 3 to 5, 7 to 9 and 11.

With respect to FIG. 14 an example electronic device which may be used as the capture device and/or audio signal analyser/processor and/or playback device is shown. The device may be any suitable electronics device or apparatus. For example in some embodiments the device 1400 is a mobile device, user equipment, tablet computer, computer, audio playback apparatus, etc.

The device 1400 may comprise a microphone or microphone array 1401. The microphone or microphone array 1401 may comprise a plurality (for example a number N) of microphone elements. However it is understood that there may be any suitable configuration of microphones and any suitable number of microphones. In some embodiments the microphone or microphone array 1401 is separate from the apparatus and the audio signal transmitted to the apparatus by a wired or wireless coupling. The microphone or microphone array 1401 may in some embodiments be the microphone array as shown in the previous figures.

The microphone or microphone array may comprise transducers configured to convert acoustic waves into suitable electrical audio signals. In some embodiments the microphone or microphone array may comprise solid state microphones. In other words the microphones may be capable of capturing audio signals and outputting a suitable digital format signal. In some other embodiments the microphone or microphone array 1401 can comprise any suitable microphone type or audio capture means, for example condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphone or microphone array can in some embodiments output the audio captured signals to an analogue-to-digital converter (ADC) 1403.

The device 1400 may further comprise an analogue-to-digital converter 1403. The analogue-to-digital converter 1403 may be configured to receive the audio signals from each microphone 1401 and convert them into a format suitable for processing. In some embodiments where the microphone or microphone array comprises integrated microphone the analogue-to-digital converter is not required. The analogue-to-digital converter 1403 can be any suitable analogue-to-digital conversion or processing means. The analogue-to-digital converter 1403 may be configured to output the digital representations of the audio signals to a processor 1207 or to a memory 1411.

In some embodiments the device 1400 comprises at least one processor or central processing unit 1207. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some implements the device 1400 comprises a transceiver 1409. The transceiver 1409 in such embodiments can be coupled to the processor 1407 and configured to enable a communication with other apparatus or electronic devices, for example via a wireless communications network. The transceiver 1409 or any suitable transceiver or transmitter and/or receiver means can in some embodiments be configured to communicate with other electronic devices or apparatus via a wire or wired coupling.

For example the transceiver 1409 may be configured to communicate with the renderer as described herein.

The transceiver 1409 can communicate with further apparatus by any suitable known communications protocol. For example in some embodiments the transceiver 1409 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the device 1400 may be employed as at least part of the audio processor. As such the transceiver 1409 may be configured to receive the audio signals and positional information from the capture device microphones or microphone array and in some embodiments determine the parameters as described herein by using the processor 1407 executing suitable code. Furthermore the device may generate a suitable audio signal and parameter output to be transmitted to the renderer or spatial processing device.

In some embodiments the device 1400 may be employed as at least part of the renderer. As such the transceiver 1409 may be configured to receive the audio signals from the microphones or microphone array and in some embodiments the parameters determined at the capture device or processing device as described herein, and generate a suitable audio signal rendering by using the processor 1407 executing suitable code. The device 1400 may comprise a digital-to-analogue converter 1413. The digital-to-analogue converter 1413 may be coupled to the processor 1407 and/or memory 1411 and be configured to convert digital representations of audio signals (such as from the processor 1407 following an audio rendering of the audio signals as described herein) to a suitable analogue format suitable for presentation via an audio subsystem output. The digital-to-analogue converter (DAC) 1413 or signal processing means can in some embodiments be any suitable DAC technology.

Furthermore the device 1400 can comprise in some embodiments an audio subsystem output 1415. An example as shown in FIG. 14 shows the audio subsystem output 1415 as an output socket configured to enabling a coupling with headphones 1421. However the audio subsystem output 1415 may be any suitable audio output or a connection to an audio output. For example the audio subsystem output 1415 may be a connection to a multichannel speaker system.

In some embodiments the digital to analogue converter 1413 and audio subsystem 1415 may be implemented within a physically separate output device. For example the DAC 1413 and audio subsystem 1415 may be implemented as cordless earphones communicating with the device 1400 via the transceiver 1409.

Although the device 1400 is shown having both audio capture, audio processing and audio rendering components, it would be understood that in some embodiments the device 1400 can comprise just some of the elements.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method for spatial audio signal processing, comprising:
   determining at least one direction parameter for respective ones of a plurality of frequency bands based on microphone signals received from a microphone array, wherein the at least one direction parameter is associated with at least one sound source relative to the microphone array;
   determining at least one respective distance parameter for the respective ones of the plurality of frequency bands, wherein the at least one respective distance parameter indicates at least one distance between the at least one sound source and the microphone array; and
   enabling at least one of an output or store of: the at least one respective distance parameter, at least one audio signal based on at least one of the microphone signals, and the at least one direction parameter.

2. The method as claimed in claim 1, wherein determining the at least one direction parameter comprising one of:
   receiving the at least one direction parameter for the respective ones of the plurality of frequency bands based on the microphone signals received from the microphone array; or
   calculating the at least one direction parameter for the respective ones of the plurality of frequency bands based on the microphone signals received from the microphone array.

3. The method as claimed in claim 1, wherein determining the at least one respective distance parameter comprising:
   processing at least two of the determined a least one direction parameter to determine a fluctuation between the at least two determined direction parameters; and
   determining the at least one respective distance parameter based on the fluctuation between the at least two determined direction parameters.

4. The method as claimed in claim 3, wherein processing the at least two determined direction parameters comprising one of:
   determining a circular variance of vectors based on the at least two determined direction parameters;
   determining a time smoothed circular variance of vectors based on the at least two determined direction parameters;
   determining a frequency smoothed circular variance of vectors based on the at least two determined direction parameters; or
   determining a time and frequency smoothed circular variance of vectors based on the at least two determined direction parameters.

5. The method as claimed in claim 4, wherein processing the at least two determined direction parameters to determine the fluctuation between the at least two determined direction parameters comprising applying a determined function to one of:
- the circular variance;
- the time smoothed circular variance;
- the frequency smoothed circular variance; or
- the time and frequency smoothed circular variance, to determine the at least one respective distance parameter.

6. The method as claimed in claim 3, wherein processing the at least two determined direction parameters comprising at least one of:
- accumulating over a time window a number of fluctuation estimates of the at least two determined direction parameters over the respective ones of the plurality of frequency bands;
- determining at least one fluctuation estimate from a number of fluctuation estimates associated with a first distance parameter value;
- determining at least one further fluctuation estimate from a number of fluctuation estimates associated with a second distance parameter value, wherein the second distance parameter value is greater than the first distance parameter value; or
- determining a normalised distance parameter based on the at least one fluctuation estimate from the number of fluctuation estimates associated with the first distance parameter value and the at least one further fluctuation estimate from the number of fluctuation estimates associated with the second distance parameter value.

7. The method as claimed in claim 6, wherein determining the at least one respective distance parameter comprising at least one of:
- determining an environment room size; or
- mapping the normalised distance parameter associated with an environment to determine the at least one respective distance parameter based on the environment room size.

8. The method as claimed in claim 1, further comprising:
- determining a depth map, wherein determining the at least one respective distance parameter for the respective ones of the plurality of frequency bands is based, at least partially, on the determined depth map and the at least one direction parameter.

9. The method as claimed in claim 8, wherein determining the depth map comprising at least one of:
- receiving the depth map from a sensor;
- receiving the depth map from a memory; or determining the depth map from at least two images captured with at least one camera, wherein the at least one camera is configured to capture the at least two images from separate space positions/orientations.

10. The method as claimed in claim 8, further comprising at least one of:
- determining a search area based on the at least one direction parameter for the respective ones of the plurality of frequency bands based on one or more of the microphone signals received from the microphone array; or
- selecting a minimum distance from the depth map over the search area.

11. The method as claimed in claim 10, wherein determining the search area comprising:
- determining a base direction based on an average of the at least one respective direction parameter for the respective ones of the plurality of frequency bands; and
- determining an extent of the search area from the base direction based on a fluctuation of the at least one direction parameter for the respective ones of the plurality of frequency bands.

12. The method as claimed in claim 1, wherein determining the at least one direction parameter comprising at least one of:
- receiving the microphone signals from the microphone array for a time window;
- time-frequency transforming the microphone signals from the microphone array for the time window; or
- analysing the time-frequency transformed microphone signals from the microphone array for the respective ones of the plurality of frequency bands to determine the at least one respective direction parameter for the respective ones of the plurality of frequency bands.

13. The method as claimed in claim 12, further comprising determining an energy ratio parameter for the respective ones of the plurality of frequency bands based on the time-frequency transformed microphone signals.

14. The method as claimed in claim 1, further comprising:
- receiving at least one user input defining a six- degrees-of-freedom parameter; and
- processing the at least one audio signal to generate a rendered output audio signal based on:
  - the at least one user input;
  - the at least one direction parameter; and
  - the at least one respective distance parameter
- to enable a six-degree of freedom audio reproduction.

15. The method of claim 14, wherein receiving the at least one user input defining the six-degrees-of-freedom parameter further comprises at least one of:
- determining a head position of a user, or
- determining an orientation of the user.

16. The method of claim 1, wherein enabling store of the at least one respective distance parameter, the at least one audio signal based on the at least one of the microphone signals, and the at least one direction parameter comprises storing the at least one respective distance parameter and the at least one direction parameter as metadata associated with the at least one audio signal.

17. A method for spatially processing at least one audio signal, comprising:
- receiving the at least one audio signal;
- receiving at least one direction parameter for respective ones of the plurality of frequency bands based on microphone signals received from a microphone array;
- receiving at least one respective distance parameter for the respective ones of the plurality of frequency bands based on the microphone signals received from the microphone array;
- receiving at least one user input defining a six- degrees-of-freedom parameter; and
- processing the at least one audio signal to generate a rendered output audio signal based on:
  - the at least one user input;
  - the at least one direction parameter; and
  - the at least one respective distance parameter
- to enable a six-degree of freedom audio reproduction.

18. The method as claimed in claim 17, further comprising associating/combining:
- the at least one direction parameter for the respective ones of the plurality of frequency bands band based on the microphone signals received from the microphone array;
- at least one energy ratio parameter for the respective ones of the plurality of frequency bands;

the at least one respective distance parameter for the respective ones of the plurality of frequency bands; and the at least one audio signal; and outputting the association/combination.

19. The method as claimed in claim 17, further comprising receiving at least at least one energy ratio parameter associated with the at least one audio signal for the respective ones of the plurality of frequency bands, wherein processing the at least one audio signal to generate the rendered output audio signal to enable the six-degree of freedom audio reproduction is further configured to process the at least one audio signal based on the at least one energy ratio parameter.

20. An apparatus comprising:

processing circuitry; and memory circuitry including computer program code, the memory circuitry and the computer program code configured to, with the processing circuitry, enable the apparatus to:

determine at least one direction parameter for respective ones of the plurality of frequency bands based on microphone signals received from a microphone array, wherein the at least one direction parameter is associated with at least one sound source relative to the microphone array;

determine at least one respective distance parameter for the respective ones of the plurality of frequency bands, wherein the at least one respective distance parameter indicates at least one distance between the at least one sound source and the microphone array; and enable at least one of: an output or store of: the at least one respective distance parameter, at least one audio signal based on at least one of the microphone signals, and the at least one direction parameter.

21. An apparatus comprising:

processing circuitry; and memory circuitry including computer program code, the memory circuitry and the computer program code configured to, with the processing circuitry, enable the apparatus to:

receive at least one audio signal;

receive at least one direction parameter for respective ones of a plurality of frequency bands based on microphone signals received from a microphone array;

receive at least one respective distance parameter for the respective ones of the plurality of frequency bands based on the microphone signals received from the microphone array;

receive at least one user input defining a six- degrees-of-freedom parameter; and process the at least one audio signal to generate a rendered output audio signal based on:

the at least one user input;

the at least one direction parameter; and the at least one respective distance parameter to enable a six-degree of freedom audio reproduction.

\* \* \* \* \*